United States Patent
Slurink

(10) Patent No.: US 10,384,884 B2
(45) Date of Patent: Aug. 20, 2019

(54) TRANSFER SYSTEM FOR TRANSFERRING ITEMS

(71) Applicant: Sluis Cigar Machinery B.V., Kampen (NL)

(72) Inventor: Oscar Slurink, Heino (NL)

(73) Assignee: Sluis Cigar Machinery B.V., Kampen (NL)

( * ) Notice: Subject to any disclaimer, the term of this patent is extended or adjusted under 35 U.S.C. 154(b) by 0 days.

(21) Appl. No.: 15/765,982

(22) PCT Filed: Sep. 28, 2016

(86) PCT No.: PCT/NL2016/050664
§ 371 (c)(1),
(2) Date: Apr. 4, 2018

(87) PCT Pub. No.: WO2017/061856
PCT Pub. Date: Apr. 13, 2017

(65) Prior Publication Data
US 2018/0290837 A1 Oct. 11, 2018

(30) Foreign Application Priority Data

Oct. 6, 2015 (NL) ...................................... 2015573

(51) Int. Cl.
*B65G 47/84* (2006.01)
*B65G 29/00* (2006.01)
(Continued)

(52) U.S. Cl.
CPC .......... *B65G 47/5131* (2013.01); *B65B 19/02* (2013.01); *B65G 29/00* (2013.01);
(Continued)

(58) Field of Classification Search
None
See application file for complete search history.

(56) References Cited

U.S. PATENT DOCUMENTS 6,000,196 A * 12/1999 Boldrini .................. B65B 19/20
493/911
7,810,629 B2 * 10/2010 Kronseder ........... B65G 17/385
198/347.1

FOREIGN PATENT DOCUMENTS

DE 102006035109 A1 1/2008
DE 102011010955 A1 8/2012
(Continued)

OTHER PUBLICATIONS

International Search Report and Written Opinion dated Jan. 4, 2017 for Application No. PCT/NL2016/050664.
Search Report dated Jun. 7, 2016 for Application No. NL 2015573.

*Primary Examiner* — Kavel Singh
(74) *Attorney, Agent, or Firm* — Patterson + Sheridan, LLP

(57) ABSTRACT

Transfer system for transferring items, which transfer system comprises a first transfer device for receiving the items, a second transfer device for discharging the items, and a buffer device for buffering items between the first transfer device and the second transfer device, wherein the first transfer device comprises a first transfer rotator and the second transfer device comprises a second transfer rotator and the transfer system is configured to adjust at least one of a first transfer speed of the first transfer rotator and a second transfer speed of the second transfer rotator.

20 Claims, 30 Drawing Sheets

(51) Int. Cl.
*B65G 19/02* (2006.01)
*B65G 47/51* (2006.01)
*B65B 19/02* (2006.01)
*A24F 47/00* (2006.01)

(52) U.S. Cl.
CPC ....... *B65G 47/5136* (2013.01); *B65G 47/846* (2013.01); *A24F 47/002* (2013.01); *B65G 2201/0226* (2013.01); *B65G 2203/0291* (2013.01)

(56) References Cited

FOREIGN PATENT DOCUMENTS

| | | |
|---|---|---|
| EP | 2604553 A1 | 6/2013 |
| GB | 2300613 A | 11/1996 |
| JP | 20174162588 A | 9/2014 |

* cited by examiner

TRANSFER SYSTEM FOR TRANSFERRING ITEMS

FIELD OF THE INVENTION

The invention relates to a transfer system for transferring items, such as parts of a simulated smoking device. The transfer system comprises a first transfer device for receiving the items and a second transfer device for discharging the items.

In practice, such a transfer system is often used in a production facility. The transfers system can in said situation be used to supply items which form part of a product to be produced. The items can be parts of a simulated smoking device or complete simulated smoking devices. The items can have a cylindrical form.

BACKGROUND OF THE INVENTION

The invention is based on the insight that there is a need in the field of the art for a more flexible transfer system.

SUMMARY OF THE INVENTION

The invention has the objective to provide an improved or at least alternative transfer system and method for supply items.

This objective is achieved by a transfer system for transferring items, such as parts of a simulated smoking device, which transfer system comprises a first transfer device for receiving the items, a second transfer device for discharging the items, and a buffer device for buffering items between the first transfer device and the second transfer device, wherein the first transfer device comprises a first transfer rotator rotatable about a fixed first transfer axis and provided with first transfer holders configured to hold the items, which first transfer holders are arranged in a first circular transfer arrangement around the first transfer axis, the second transfer device comprises a second transfer rotator rotatable about a fixed second transfer axis and provided with second transfer holders configured to hold the items, which second transfer holders are arranged in a second circular transfer arrangement around the second transfer axis, the buffer device comprises at least two buffer rotators, each buffer rotator being rotatable about a respective buffer axis which is movable along a predetermined buffer trajectory, and each buffer rotator being provided with buffer holders configured to hold the items and arranged in a circular buffer arrangement around the buffer axis, the at least two buffer rotators are positioned one after the other, neighbouring buffer rotators being arranged near each other in a respective buffer region to transfer the items from one of the buffer rotators of said neighbouring buffer rotators to the other, the buffer device is configured to hold the buffer axes of neighbouring buffer rotators at a respective constant buffer distance during their movement along their buffer trajectory, the at least two buffer rotators comprise a first buffer rotator having a first buffer axis which is movable along a first buffer trajectory and a last buffer rotator having a last buffer axis which is movable along a last buffer trajectory, the first transfer rotator is arranged near the first buffer rotator in a first transfer region to transfer the items from the first transfer rotator to the first buffer rotator, and the last buffer rotator is arranged near the second transfer rotator in a second transfer region to transfer the items from the last buffer rotator to the second transfer rotator, the first buffer trajectory defines a first part of a first circle having a first centre coinciding with the first transfer axis, the last buffer trajectory defines a second part of a second circle having a second centre coinciding with the second transfer axis, and the transfer system is configured to adjust at least one of a first transfer speed of the first transfer rotator and a second transfer speed of the second transfer rotator.

By adjusting the first transfer speed of the first transfer rotator and/or the second transfer speed of the second transfer rotator, the number of items located in the buffer device can be controlled. This makes it possible to control the way in which the items are received and/or discharged by the transfer system. For example, the first transfer rotator can rotate with a constant first transfer speed to receive the items in a continuous manner and the second transfer rotator can rotate with a varying second transfer speed to discharge the items in an intermittent manner.

In an embodiment of the transfer system, the transfer system is configured to switch between a first operation mode wherein the second transfer speed is lower than the first transfer speed in order to increase the number of items located in the buffer device, and a second operation mode wherein the second transfer speed is higher than the first transfer speed in order to decrease the number of items located in the buffer device.

In an embodiment of the transfer system, the second transfer speed is equal to zero in the first operation mode.

In an embodiment of the transfer system, the first transfer rotator rotates during the first operation mode and the second operation mode at the same constant first transfer speed.

In an embodiment of the transfer system, the transfer system is configured to rotate the first transfer rotator and the second transfer rotator independent from each other.

In an embodiment of the transfer system, the transfer system comprises a first rotation drive to rotate the first transfer rotator about the first transfer axis at the first transfer speed and a first control unit communicating with the first rotation drive to control the first transfer speed.

In an embodiment of the transfer system, the transfer system comprises a second rotation drive to rotate the second transfer rotator about the second transfer axis at the second transfer speed and a second control unit communicating with the second rotation drive to control the second transfer speed.

In an embodiment of the transfer system, neighbouring buffer rotators are interconnected via a respective buffer connector to maintain the constant buffer distance between the buffer axes of said neighbouring buffer rotators during their movement along their buffer trajectory.

In an embodiment of the transfer system, the first transfer rotator and the first buffer rotator are interconnected via a first transfer connector to maintain a constant first transfer distance between the first transfer axis and the first buffer axis during its movement along the first buffer trajectory, and the second transfer rotator and the last buffer rotator are interconnected via a second transfer connector to maintain a constant second transfer distance between the second transfer axis and the last buffer axis during its movement along the last buffer trajectory.

In an embodiment of the transfer system, the first transfer rotator and the first buffer rotator are operatively connected via a first transfer rotation transmission, neighbouring buffer rotators are operatively connected with each other by a respective buffer rotation transmission, and the second transfer rotator and the last buffer rotator are operatively connected via a second transfer rotation transmission.

In an embodiment of the transfer system, the first transfer rotator is connected to a first transfer gear wheel and the first buffer rotator is connected to a first buffer gear wheel, which first transfer gear wheel and first buffer gear wheel are operatively connected to form the first transfer rotation transmission, each of the neighbouring buffer rotators is connected to a respective buffer gear wheel, which buffer gear wheels are operatively connected to form the buffer rotation transmission of said neighbouring buffer rotators, and the second transfer rotator is connected to a second transfer gear wheel and the last buffer rotator is connected to a last buffer gear wheel, which second transfer gear wheel and last buffer gear wheel are operatively connected to form the second transfer rotation transmission.

In an embodiment of the transfer system, a first transfer guide is provided at the first transfer region to guide the items from the first transfer rotator to the first buffer rotator, a buffer guide is provided at each of the buffer regions of the neighbouring buffer rotators to guide the items from one of the buffer rotators of the respective neighbouring buffer rotators to the other, and a second transfer guide is provided at the second transfer region to guide the items from the last buffer rotator to the second transfer rotator.

In an embodiment of the transfer system, the first transfer guide is configured to maintain located in a first transfer position with respect to a straight first transfer line extending through the first transfer axis and the first buffer axis, each buffer guide is configured to maintain located in a respective buffer position with respect to a straight buffer line extending through the buffer axes of the neighbouring buffer rotators, the second transfer guide is configured to maintain located in a second transfer position with respect to a straight second transfer line extending through the second transfer axis and the last buffer axis.

In an embodiment of the transfer system, each buffer guide is attached to the buffer connector of the respective neighbouring buffer rotators.

In an embodiment of the transfer system, the first transfer guide is attached to the first transfer connector and the second transfer guide is attached to the second transfer connector.

In an embodiment of the transfer system, the at least two buffer rotators only comprise the first buffer rotator and the last buffer rotator, and the first buffer rotator is arranged near the last buffer rotator in a first buffer region to transfer the items from the first buffer rotator to the last buffer rotator.

In an embodiment of the transfer system, the first buffer rotator and the last buffer rotator are interconnected via a first buffer connector to maintain a constant first buffer distance between the first buffer axis and the last buffer axis during their movement along the first buffer trajectory and the last buffer trajectory, respectively.

In an embodiment of the transfer system, the first buffer rotator and the last buffer rotator are operatively connected via a first buffer rotation transmission.

In an embodiment of the transfer system, the at least two buffer rotators only comprise the first buffer rotator, the last buffer rotator, and a second buffer rotator having a second buffer axis which is movable along a second buffer trajectory, the first buffer rotator is arranged near the second buffer rotator in a first buffer region to transfer the items from the first buffer rotator to the second buffer rotator, and the second buffer rotator is arranged near the last buffer rotator in a second buffer region to transfer the items from the second buffer rotator to the last buffer rotator.

In an embodiment of the transfer system, the first buffer rotator and the second buffer rotator are interconnected via a first buffer connector to maintain a constant first buffer distance between the first buffer axis and the second buffer axis during their movement along the first buffer trajectory and the second buffer trajectory, respectively, and the second buffer rotator and the last buffer rotator are interconnected via a second buffer connector to maintain a constant second buffer distance between the second buffer axis and the last buffer axis during their movement along the second buffer trajectory and the last buffer trajectory, respectively.

In an embodiment of the transfer system, the transfer system comprises a movement limiter to ensure that the second buffer axis of the second buffer rotator is only movable along the second buffer trajectory.

In an embodiment of the transfer system, the transfer system comprises a manipulator to provide the second buffer rotator with a preference to move in a predetermined direction along the second buffer trajectory.

In an embodiment of the transfer system, the first buffer rotator and the second buffer rotator are operatively connected via a first buffer rotation transmission, and the second buffer rotator and the last buffer rotator are operatively connected via a second buffer rotation transmission.

The invention further relates to a method for transferring items, such as parts of a simulated smoking device, with a transfer system according to the invention, comprising providing the items to the first transfer rotator of the first transfer device, while the first transfer rotator rotates at the first transfer speed, and adjusting at least one of the first transfer speed of the first transfer rotator and the second transfer speed of the second transfer rotator in order to control the discharging of the items by the second transfer rotator.

BRIEF DESCRIPTION OF THE DRAWINGS

Embodiments of the transfer system and the method will be described by way of example only, with reference to the accompanying schematic drawings in which corresponding reference symbols indicate corresponding parts, and in which.

DETAILED DESCRIPTION OF THE DRAWINGS

Figure 1:
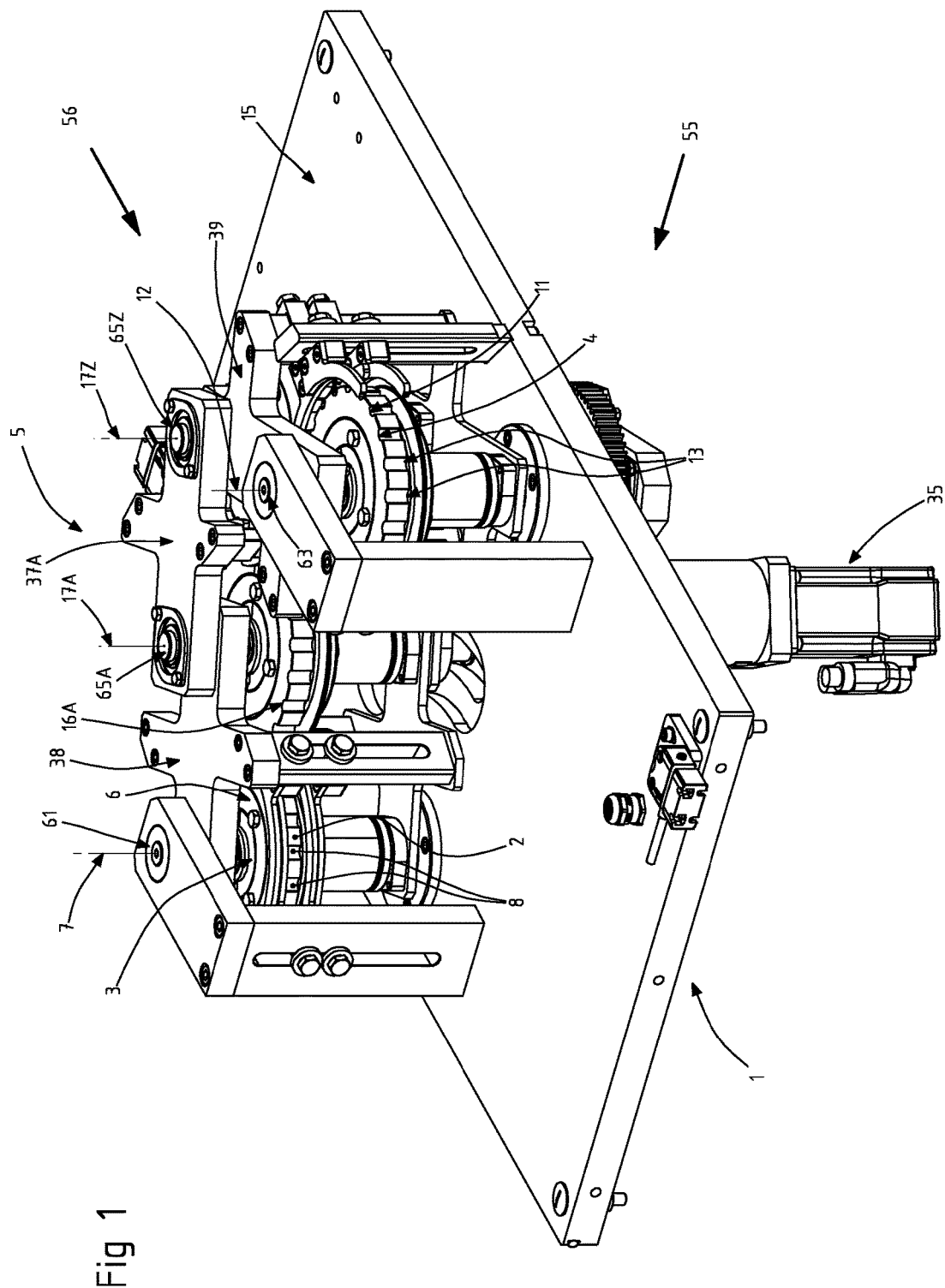
FIG. 1 schematically shows a view in perspective of an embodiment of the transfer system according to the invention, FIG. 2 schematically shows a side view of the transfer system of FIG. 1, FIG. 3 schematically shows a further side view of the transfer system of FIG. 1, FIG. 4 schematically shows a top view of the transfer system of FIG. 1, FIG. 5A schematically shows a bottom view of the transfer system of FIG. 1, the FIGS. 5B-D schematically show alternative embodiments of the transfer system according to the invention, the FIGS. 6-12 schematically show an enlarged view of part of the top view of FIG. 4, FIG. 13 schematically shows a top view of a base plate of the transfer system of FIG. 1, the FIGS. 14-20 schematically show an enlarged view of part of the bottom view of FIG. 5A, the FIGS. 21-26 schematically show a top view of a second embodiment of the transfer system according to the invention, and FIG. 27 schematically shows a bottom view of the transfer system of FIG. 21.
Figure 2:
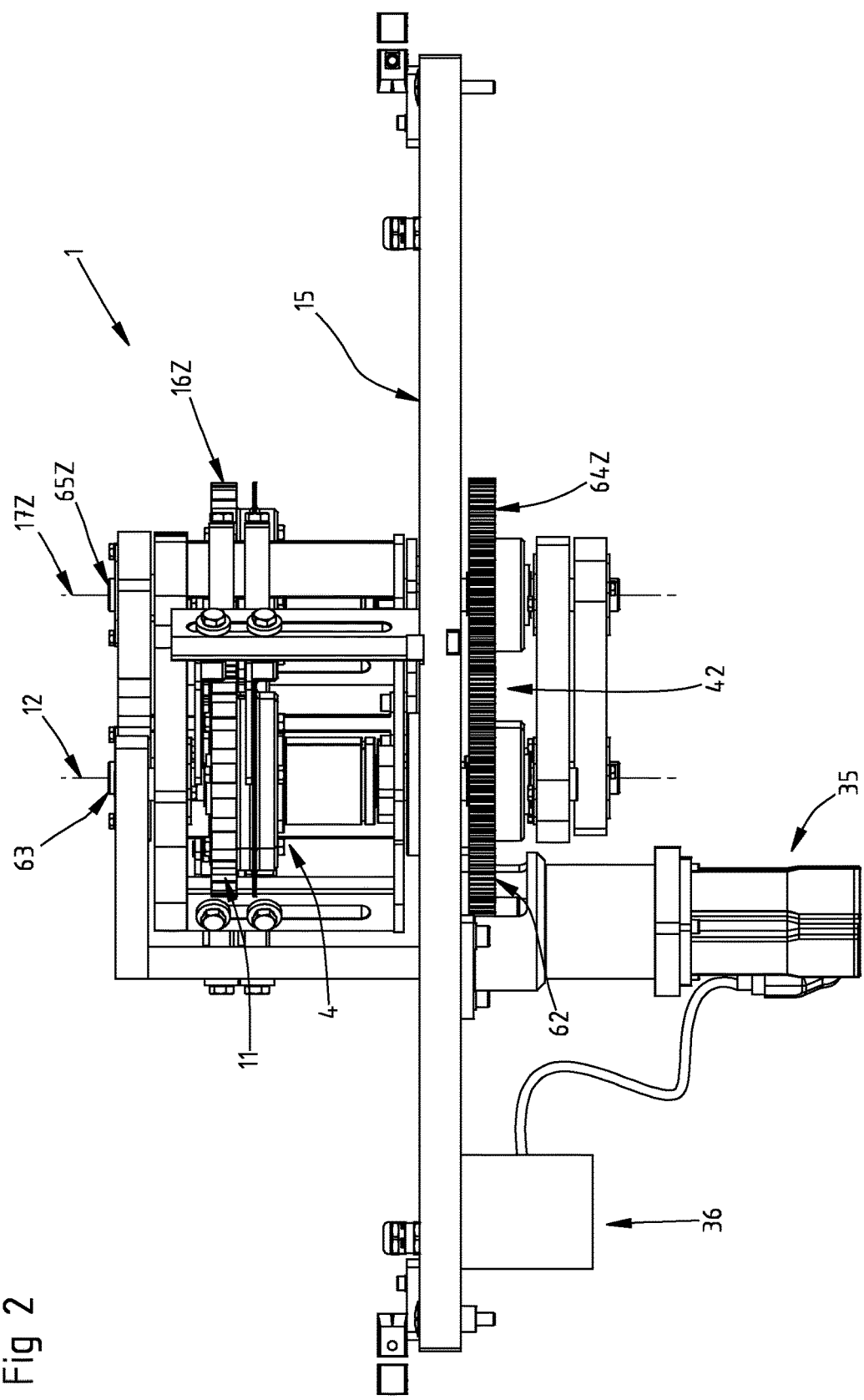
Figure 3:
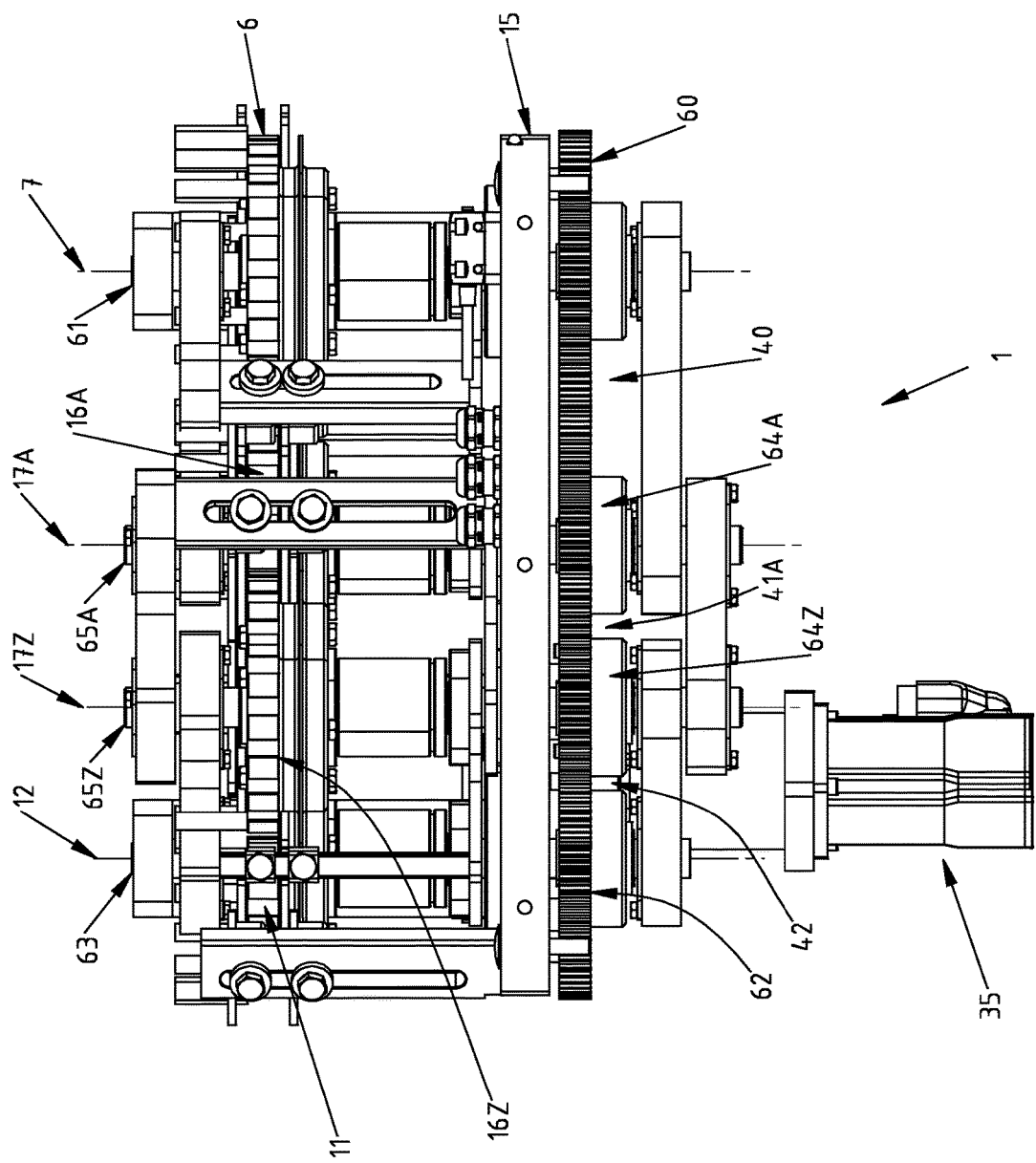
Figure 4:
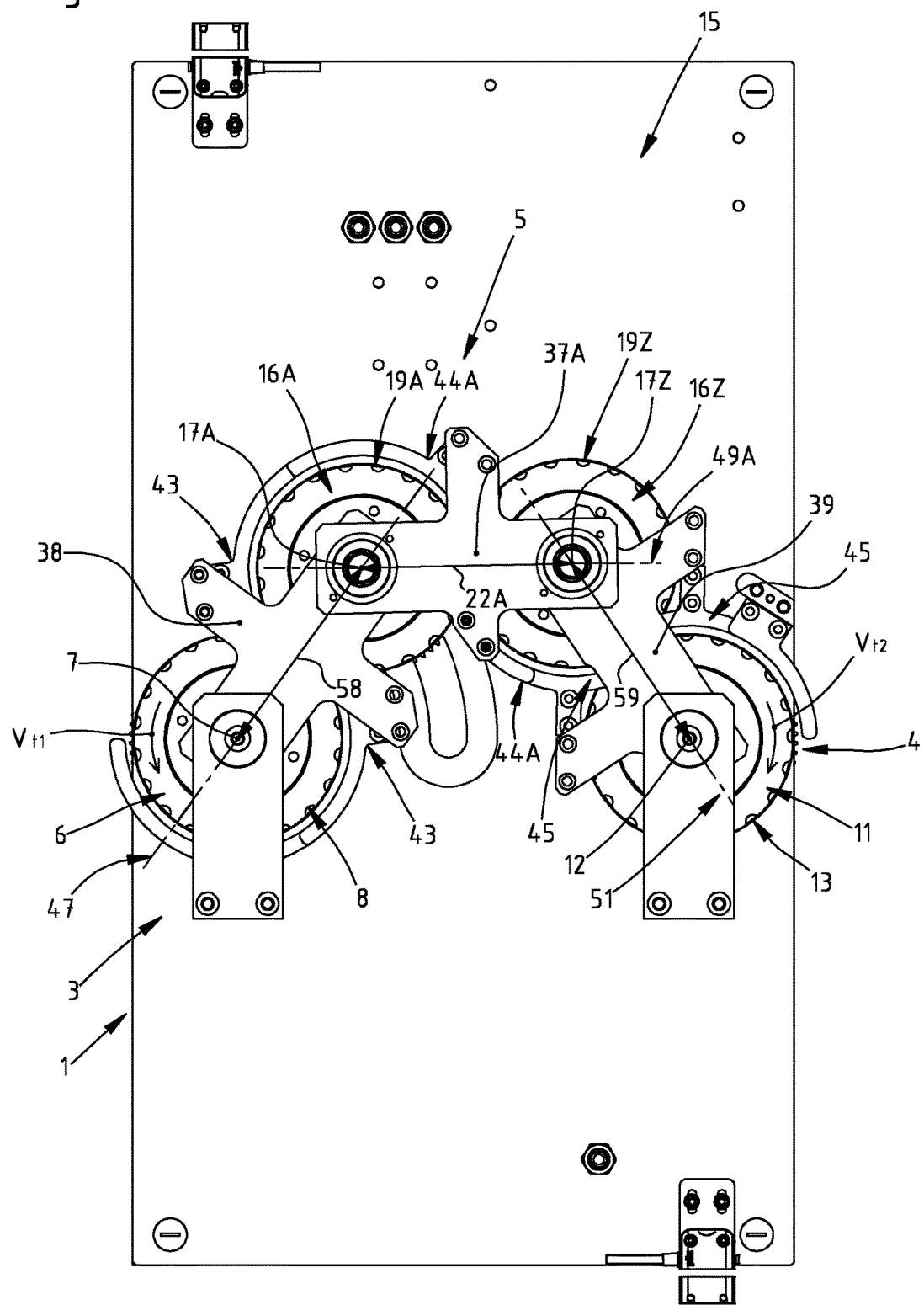
Figure 5A:
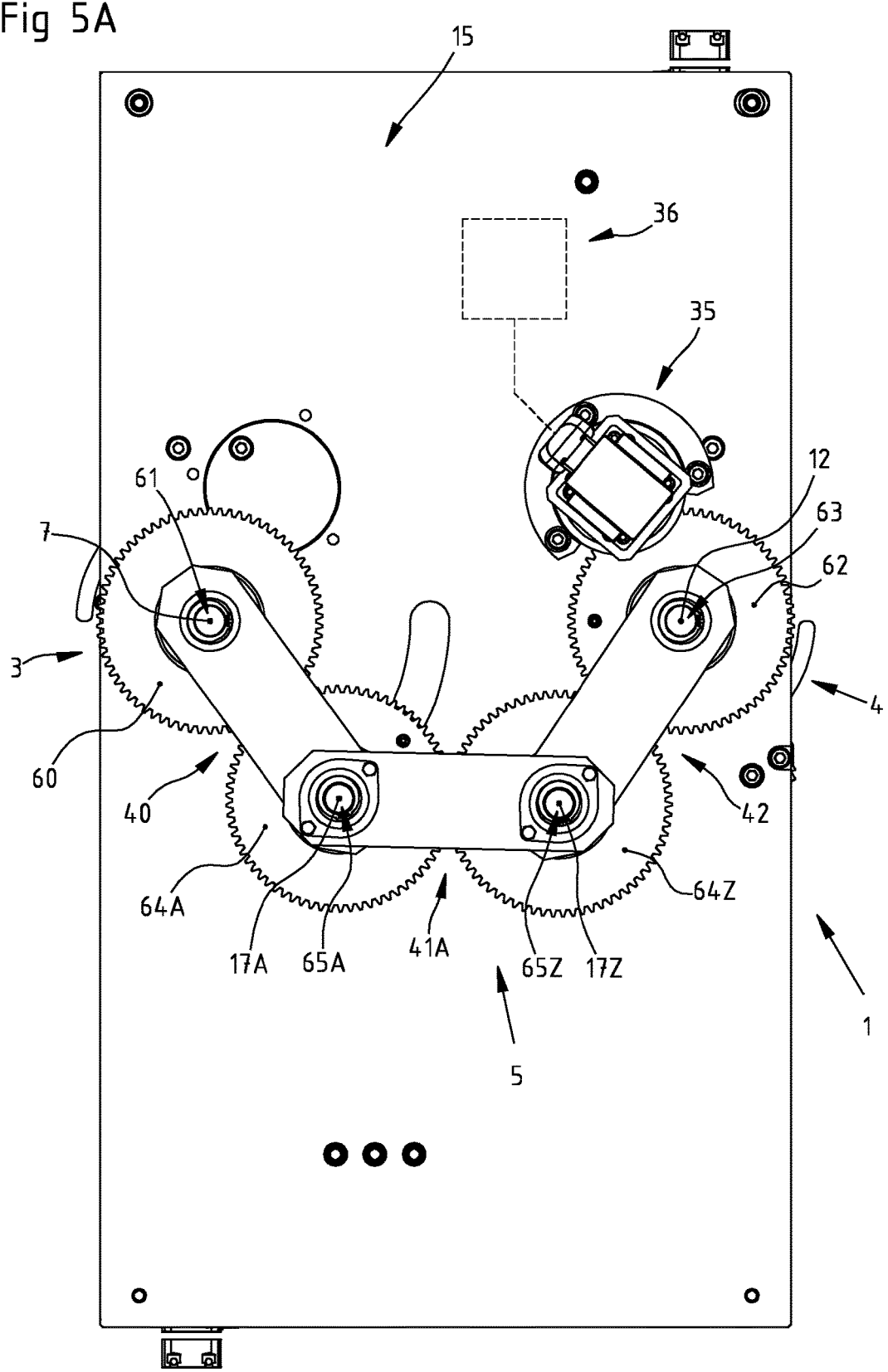

FIG. 1 shows a view in perspective of an embodiment of the transfer system 1. FIG. 2 shows a side view in the direction of arrow 55 shown in FIG. 1. FIG. 3 shows a side view in the direction of arrow 56 shown in FIG. 1. The FIGS. 4 and 5A show a top view and bottom view, respectively, of the transfer system of FIG. 1.

The transfer system 1 is configured to transfer items 2, such as parts of a simulated smoking device. The transfer system 1 comprises a first transfer device 3 for receiving the items 2, a second transfer device 4 for discharging the items 2, and a buffer device 5 for buffering items 2 between the first transfer device 3 and the second transfer device 4.

The first transfer device 3 comprises a first transfer rotator 6 rotatable about a fixed first transfer axis 7 and provided with first transfer holders 8 configured to hold the items 2. The first transfer holders 8 are arranged in a first circular transfer arrangement 9 around the first transfer axis 7.

The second transfer device 4 comprises a second transfer rotator 11 rotatable about a fixed second transfer axis 12 and provided with second transfer holders 13 configured to hold the items 2. The second transfer holders 13 are arranged in a second circular transfer arrangement 14 around the second transfer axis 12.

The buffer device 5 comprises at least two buffer rotators 16A, 16Z. Each buffer rotator 16A, 16Z is rotatable about a respective buffer axis 17A, 17Z which is movable along a predetermined buffer trajectory 18A, 18Z. Each buffer rotator 16A, 16Z is provided with buffer holders 19A, 19Z configured to hold the items 2 and arranged in a circular buffer arrangement 20A, 20Z around the buffer axis 17A, 17Z.

The at least two buffer rotators 16A, 16Z are positioned one after the other. Neighbouring buffer rotators 16A, 16Z are arranged near each other in a respective buffer region 21A to transfer the items 2 from one of the buffer rotators 16A of said neighbouring buffer rotators 16A, 16Z to the other buffer rotator 16Z.

The buffer device 5 is configured to hold the buffer axes 17A, 17Z of neighbouring buffer rotators 16A, 16Z at a respective constant buffer distance 22A during their movement along their buffer trajectory 18A, 18Z.

The at least two buffer rotators 16A, 16Z comprise a first buffer rotator 16A having a first buffer axis 17A which is movable along a first buffer trajectory 18A and a last buffer rotator 16Z having a last buffer axis 17Z which is movable along a last buffer trajectory 18Z.

The first transfer rotator 6 is arranged near the first buffer rotator 16A in a first transfer region 23 to transfer the items 2 from the first transfer rotator 6 to the first buffer rotator 16A. The last buffer rotator 16Z is arranged near the second transfer rotator 11 in a second transfer region 24 to transfer the items 2 from the last buffer rotator 16Z to the second transfer rotator 11.

The first buffer trajectory 18A defines a first part 25 of a first circle 26 having a first centre 27 coinciding with the first transfer axis 7. The last buffer trajectory 18Z defines a second part 28 of a second circle 29 having a second centre 30 coinciding with the second transfer axis 12.

The transfer system 1 is configured to adjust at least one of a first transfer speed ($v_{t1}$) of the first transfer rotator 6 and a second transfer speed ($v_{t2}$) of the second transfer rotator 11. This way, the number of items 2 located in the buffer device 5 can be controlled. This makes it possible to control the way in which the items 2 are received and/or discharged by the transfer system 1.

As will be explained in detail in relation the FIGS. 6-13, the first transfer rotator 6 rotates with a constant first transfer speed to receive the items 2 in a continuous manner and the second transfer rotator 11 rotates with a varying second transfer speed to discharge the items 2 in an intermittent manner. Other configurations are possible, such as wherein the first transfer rotator 6 rotates with a varying first transfer speed to receive the items 2 in an intermittent manner and the second transfer rotator 11 rotates with a constant second transfer speed to discharge the items 2 in a continuous manner or wherein the first transfer rotator 6 rotates with a varying first transfer speed to receive the items 2 in an intermittent manner and the second transfer rotator 11 rotates with a different varying second transfer speed to discharge the items 2 in a different intermittent manner.

In the transfer device of FIG. 1, the at least two buffer rotators only comprise the first buffer rotator 16A and the last buffer rotator 16Z. The first buffer rotator 16A is arranged near the last buffer rotator 16Z in a first buffer region 21A to transfer the items 2 from the first buffer rotator 16A to the last buffer rotator 16Z.

As amongst others shown in FIG. 4, the first buffer rotator 16A and the last buffer rotator 16Z are interconnected via a first buffer connector 37A to maintain a constant first buffer distance 22A between the first buffer axis 17A and the last buffer axis 17Z during their movement along the first buffer trajectory 18A and the last buffer trajectory 18Z, respectively.

The first transfer rotator 6 and the first buffer rotator 16A are interconnected via a first transfer connector 38 to maintain a constant first transfer distance 58 between the first transfer axis 7 and the first buffer axis 17A during its movement along the first buffer trajectory 18A. The second transfer rotator 11 and the last buffer rotator 16Z are interconnected via a second transfer connector 39 to maintain a constant second transfer distance 59 between the second transfer axis 12 and the last buffer axis 17Z during its movement along the last buffer trajectory 18Z. In other embodiments, guides can be used to ensure that the first transfer axis 7 and the second transfer axis 12 are moved along the first buffer trajectory 18A and the second buffer trajectory 18B, respectively.

As shown in FIG. 5A, the first transfer rotator 6 and the first buffer rotator 16A are operatively connected via a first transfer rotation transmission 40, the first buffer rotator 16A and the last buffer rotator 16Z are operatively connected via a first buffer rotation transmission 41A, and the second transfer rotator 11 and the last buffer rotator 16Z are operatively connected via a second transfer rotation transmission 42.

The first transfer device 3 comprises a first transfer gear wheel 60 connected to a first transfer rotation shaft 61. The first transfer rotator 6 is also connected to the first transfer rotation shaft 61. The second transfer device 4 comprises a second transfer gear wheel 62 connected to a second transfer rotation shaft 63. The second transfer rotator 11 is also connected to the second transfer rotation shaft 63. The buffer device 5 comprises a first buffer gear wheel 64A connected to a first buffer rotation shaft 65A and a last buffer gear wheel 64Z connected to a last buffer rotation shaft 65Z. The first buffer rotator 16A is connected the first buffer rotation shaft 65A and the last buffer rotator 16Z is connected the last buffer rotation shaft 65Z.

The first transfer rotation transmission 40 is formed by the first transfer gear wheel 60 engaging the first buffer gear wheel 64A. The second transfer rotation transmission 42 is formed by the second transfer gear wheel 62 engaging the last buffer gear wheel 64Z. The first buffer rotation transmission 41A is formed by the first buffer gear wheel 64A engaging the last buffer gear wheel 64Z. In the shown embodiment, the rotation transmissions 40, 41, 42 are formed by gear wheels 60, 64A, 64Z, 62 which are in direct contact with each other. The rotation transmissions are for example also possible with chain wheels and chains or pulley's and belts. Other types of rotation transmissions can also be used.

The transfer system 1 is configured to rotate the first transfer rotator 6 and the second transfer rotator 11 independent from each other.

Figure 5B:
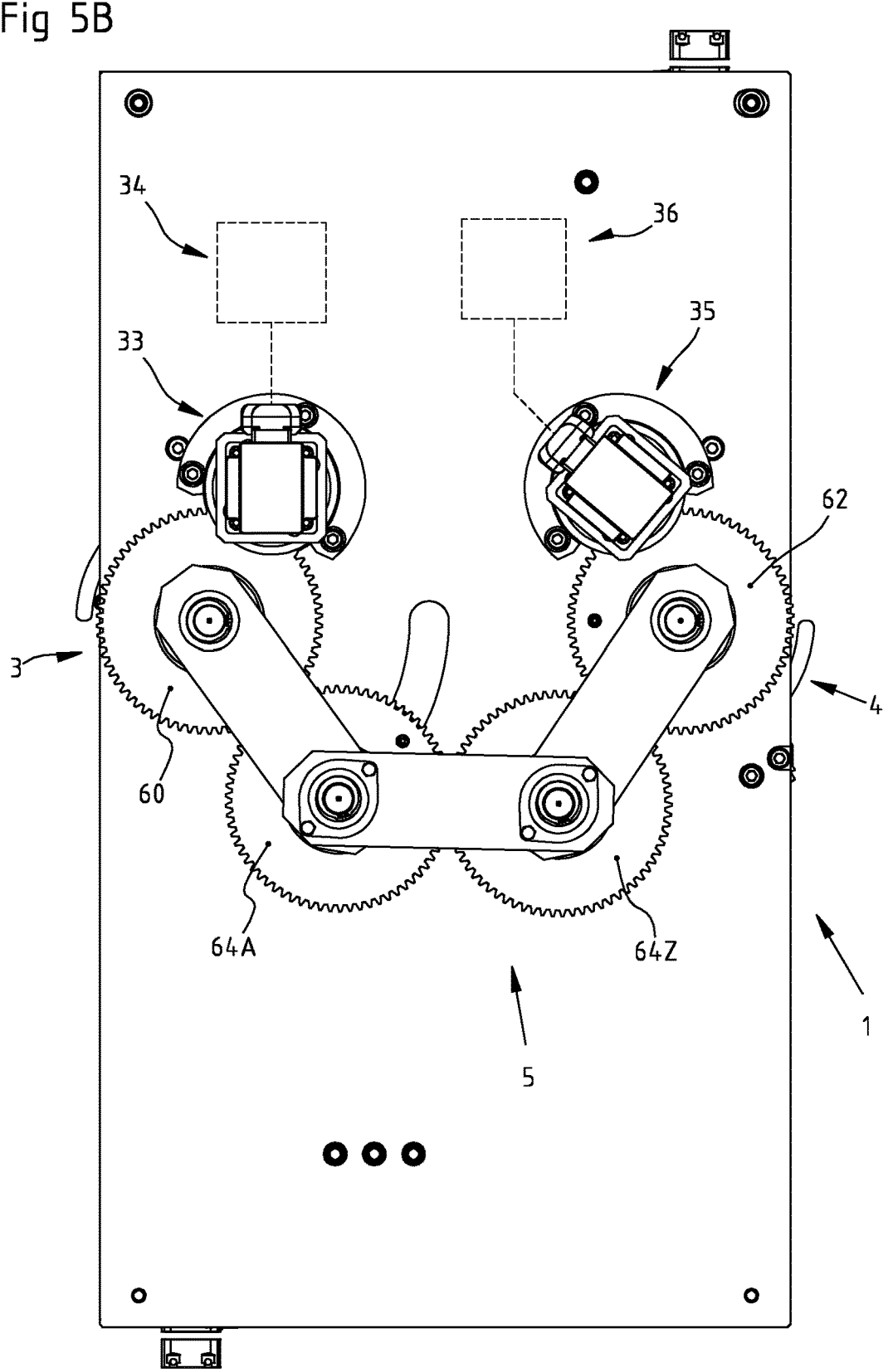
Figure 5C:
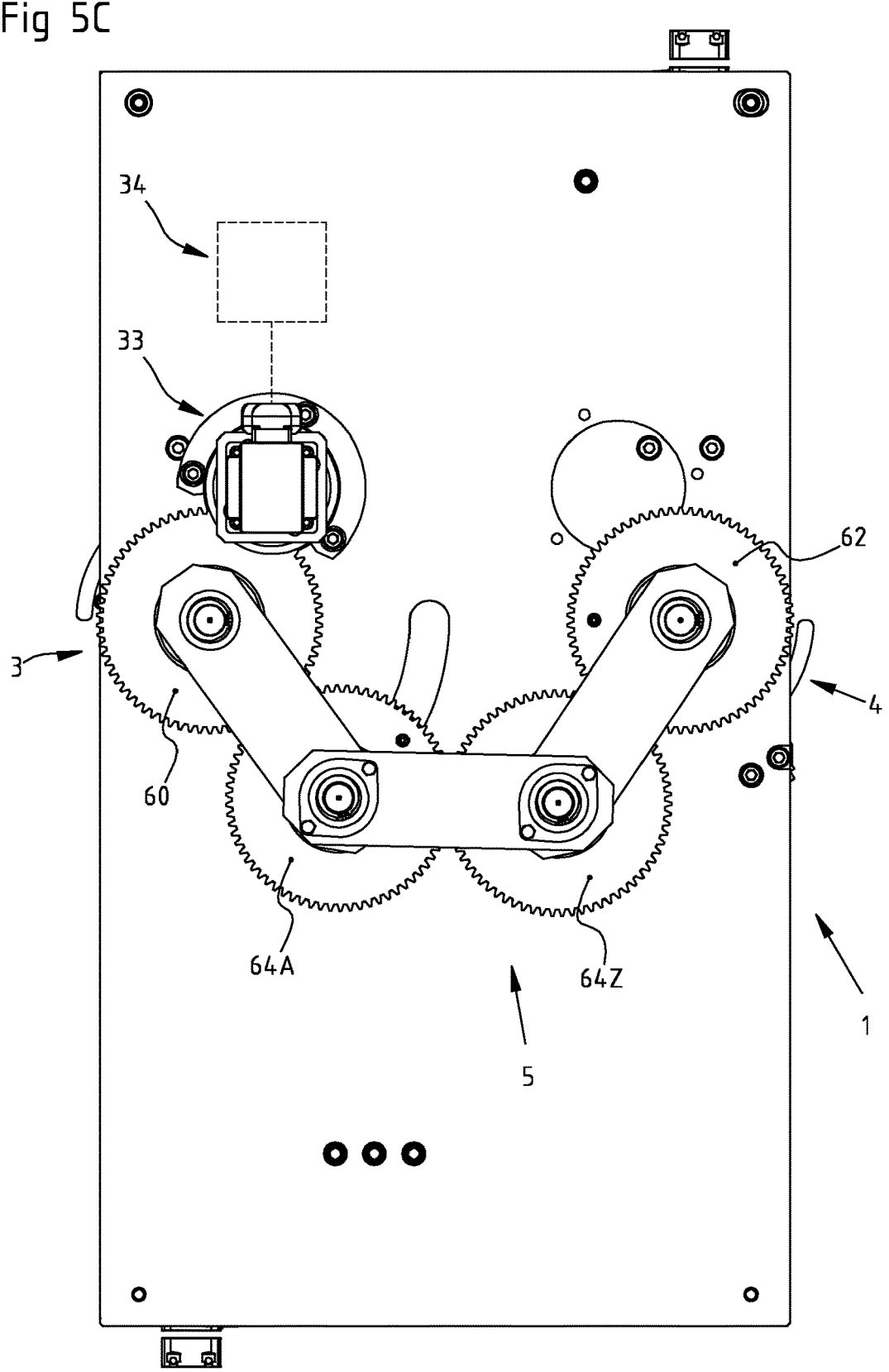

The first transfer rotator 6 will in use be engaged and driven at the first transfer speed by an item supply (not shown) acting on the first transfer device 3. In the alternative embodiments of the transfer system 1 shown in the FIGS. 5B and 5C, the transfer system 1 comprises a first rotation drive 33 to rotate the first transfer rotator 6 about the first transfer axis 7 at the first transfer speed and a first control unit 34 communicating with the first rotation drive 33 to control the first transfer speed.

Figure 5D:
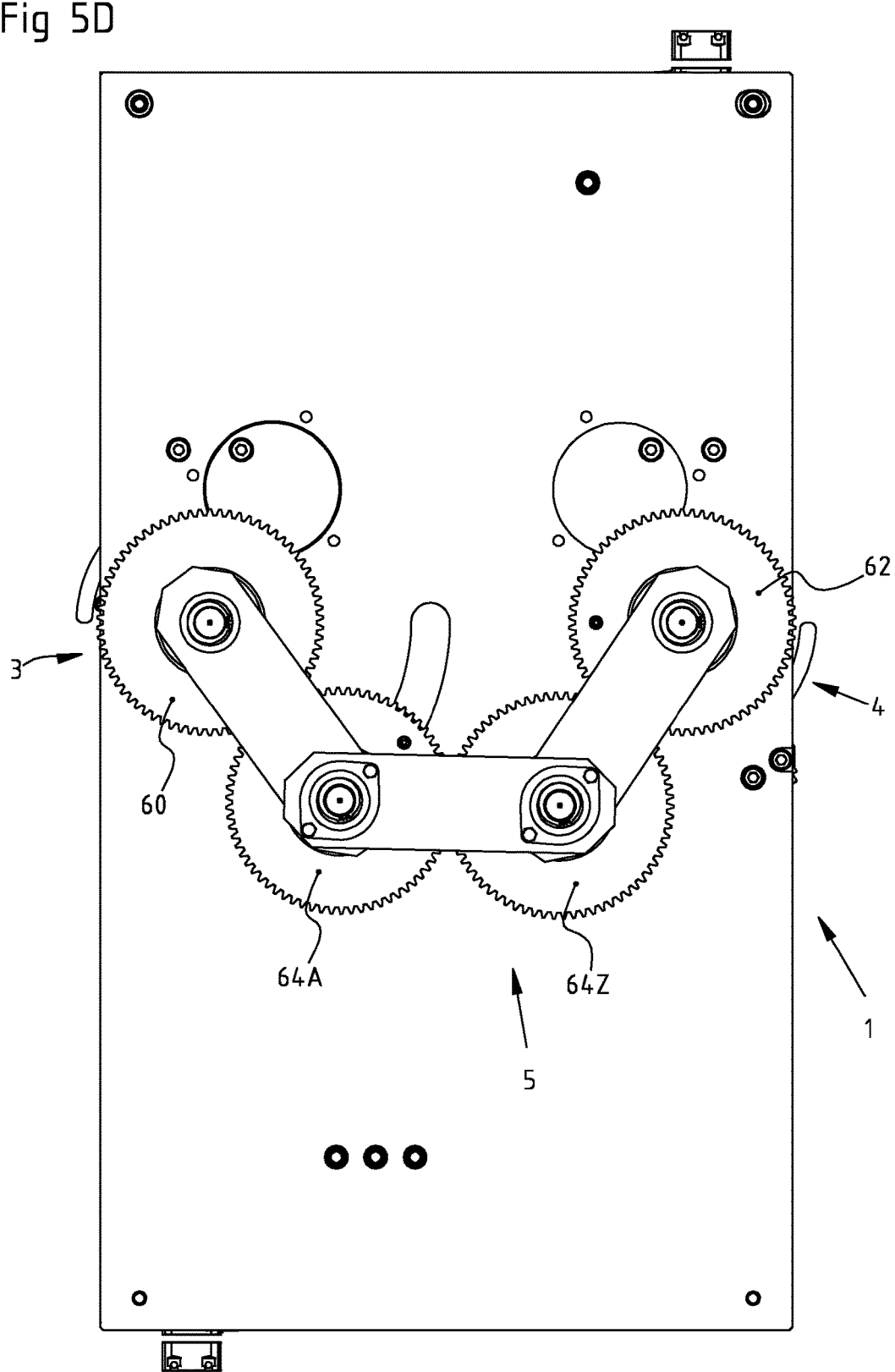

The transfer system 1 comprises a second rotation drive 35 to rotate the second transfer rotator 11 about the second transfer axis 12 at the second transfer speed and a second control unit 36 communicating with the second rotation drive 35 to control the second transfer speed. In the alternative embodiments of the transfer system 1 shown in the FIGS. 5C and 5D, the second transfer rotator 11 is engaged and driven at the second transfer speed by an item discharger (not shown) acting on the second transfer device 4.

The first control unit 34 and second control unit 36 can be integrated to form a single control unit (not shown).

The FIGS. 6-12 show an enlarged view of part of the top view of FIG. 4. The first transfer connector 38, the second transfer connector 39 and the first buffer connector 37A are removed to shown more details of the transfer system 1.

As can be seen, a first transfer guide 43 is provided at the first transfer region 23 to guide the items 2 from the first transfer rotator 6 to the first buffer rotator 16A. A first buffer guide 44A is provided at of the first buffer region 21A of the neighbouring first and last buffer rotators 16A, 16Z to guide the items 2 from the first buffer rotator 16A to the last buffer rotator 16Z. A second transfer guide 45 is provided at the second transfer region 24 to guide the items 2 from the last buffer rotator 16Z to the second transfer rotator 11.

The first transfer guide 43 is configured to maintain in a first transfer position with respect to a straight first transfer line 47 extending through the first transfer axis 7 and the first buffer axis 17A. The first buffer guide 44A is configured to maintain located in a first buffer position with respect to a first straight buffer line 49A extending through the buffer axes 17A, 17Z of the neighbouring buffer rotators 16A, 16Z. The second transfer guide 45 is configured to maintain located in a second transfer position with respect to a straight second transfer line 51 extending through the second transfer axis 12 and the last buffer axis 17Z.

The first transfer guide 43 is attached to the first transfer connector 38 and the second transfer guide 45 is attached to the second transfer connector 39. The first buffer guide 44A is attached to the first buffer connector 37A.

The FIGS. 6-12 show the transfer system 1 in operation. The first transfer rotator 6 rotates with a constant first transfer speed ($v_{r1}$) to receive the items 2 in a continuous manner and the second transfer rotator 11 rotates with a varying second transfer speed ($v_{r2}$) to discharge the items 2 in an intermittent manner. The transfer system 1 is configured to switch between a first operation mode wherein the second transfer speed is lower than the first transfer speed in order to increase the number of items 2 located in the buffer device 5, and a second operation mode wherein the second transfer speed is higher than the first transfer speed in order to decrease the number of items 2 located in the buffer device 5. The first operation mode is shown in the FIGS. 6-9 and the second operation mode in the FIGS. 10-12.

Figure 6:
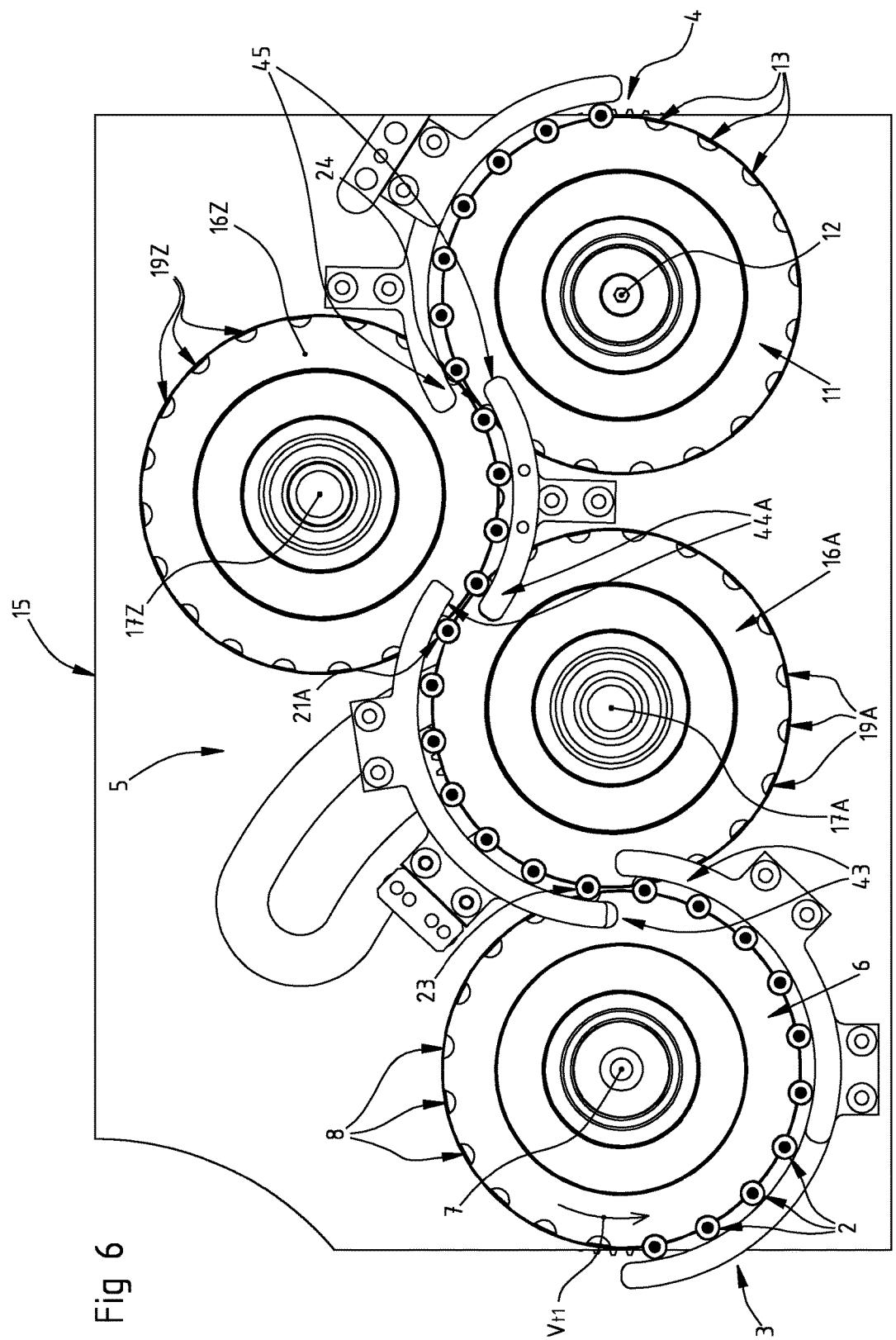

The first transfer speed with which the first transfer rotator 6 rotates is constant during the first operation mode and the second operation mode. The second transfer speed in the first operation mode is zero, which means that the second transfer rotator 11 does not rotate and therefore does not discharge any items 2. FIG. 6 shows the starting position of the transfer system 1 in the first operation mode. Since the second transfer speed of the second transfer rotator 11 is lower than the first transfer speed of the first transfer rotator 6, the first buffer rotator 16A and the last buffer rotator 16Z will move along the first buffer trajectory 18A and the last buffer trajectory 18Z. This is caused by the fact that the rotators 6, 11, 16 are interconnected by rotation transmissions 40, 41, 42 (see FIG. 5). During this movement, the number of items 2 held by the first buffer rotator 16A and second buffer rotator 16B will increase.

Figure 7:
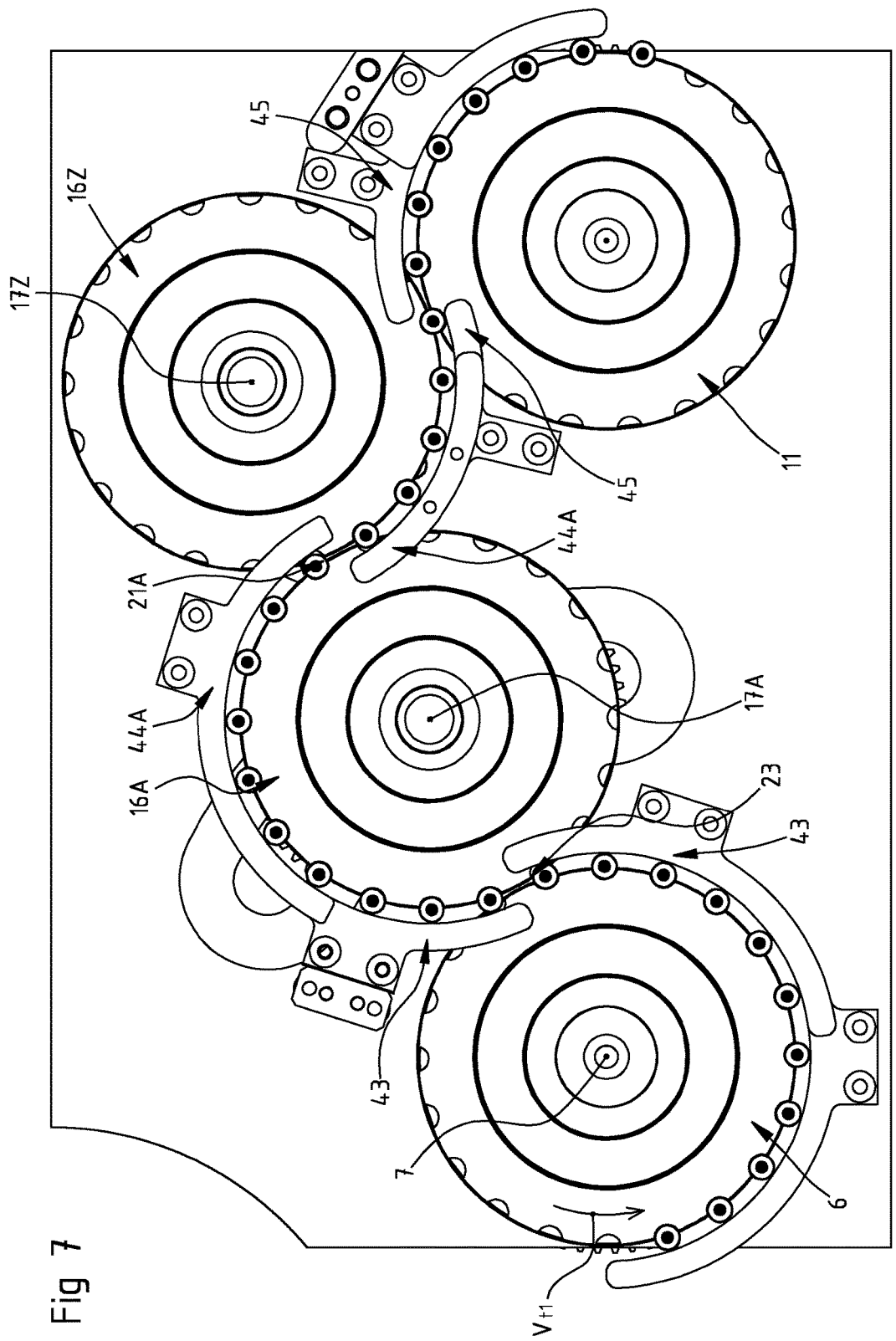

FIG. 7 shows the situation wherein the first buffer rotator 16A and the last buffer rotator 16Z have been moved out the starting position of the first operation mode. The first buffer rotator 16A and the last buffer rotator 16Z have moved upwardly along their first buffer trajectory 18A and last buffer trajectory 18Z. The last buffer rotator 16Z is now in its most upper position of the last buffer trajectory 18Z.

Figure 8:
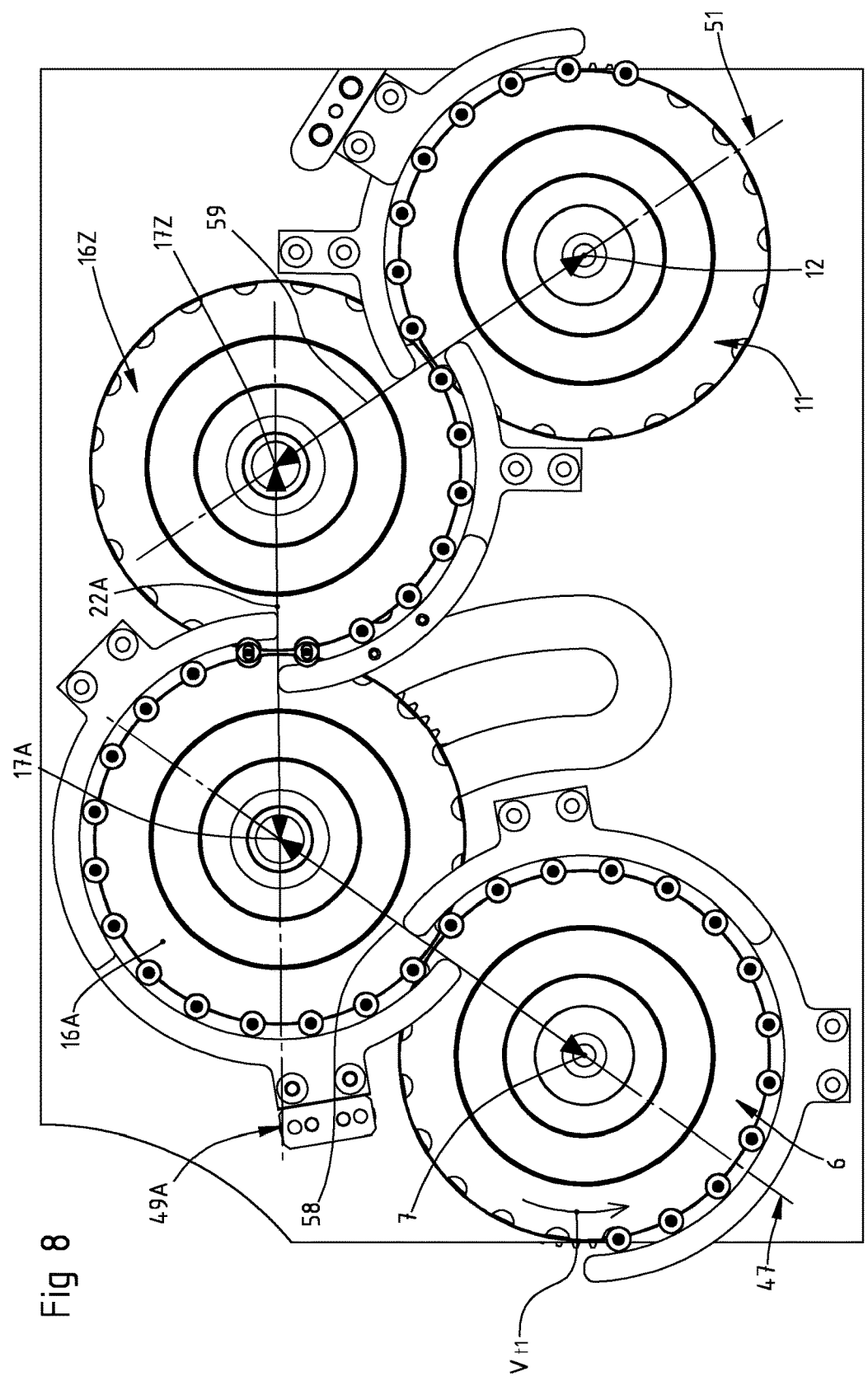

In FIG. 8, the first buffer rotator 16A has moved further upwardly along its first buffer trajectory 18A and the last buffer rotator 16Z has moved downwardly along its last buffer trajectory 18Z and back where it was at the starting position of the first operation mode shown in FIG. 6.

Figure 9:
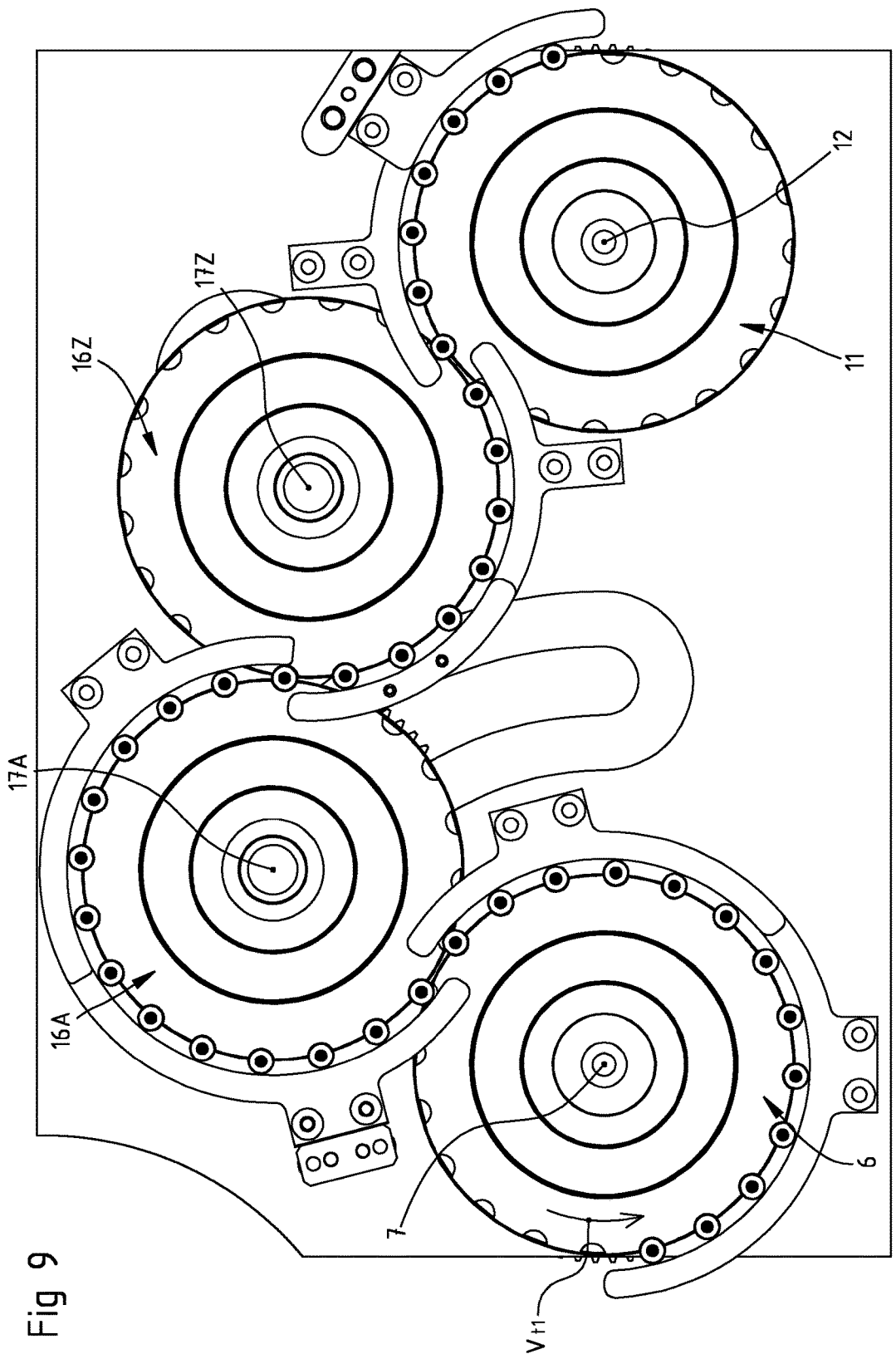

In FIG. 9, the first buffer rotator 16A has moved further upwardly along its first buffer trajectory 18A and the last buffer rotator 16Z has moved further downwardly along its last buffer trajectory 18Z. The first buffer rotator 16A is now located in its most upper position of the first buffer trajectory 18A and the last buffer rotator 16Z is now located in the most lower position of the last buffer trajectory 18Z. This is the end position of the first mode and the second mode will start from here.

Figure 10:
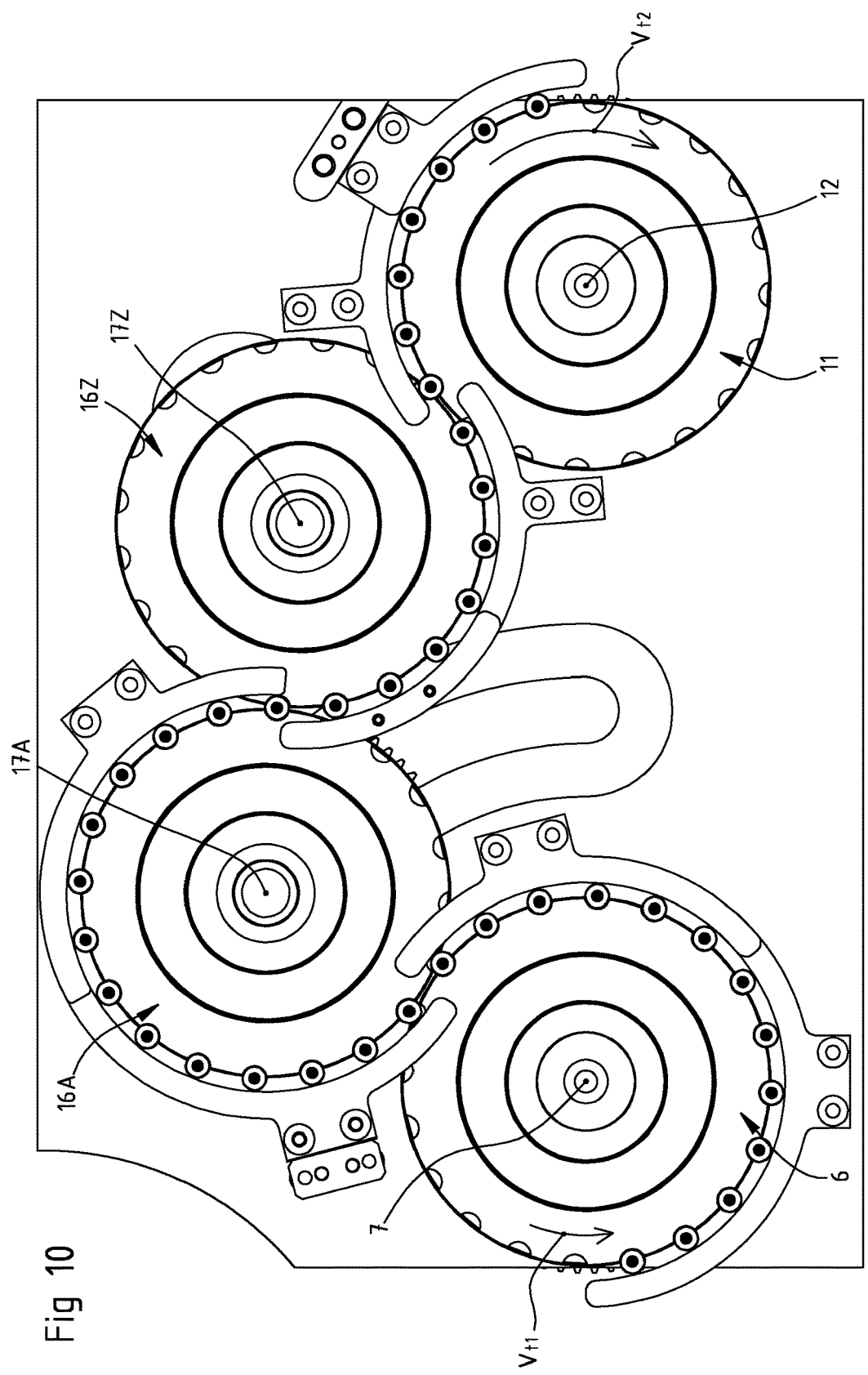

FIG. 10 shows the starting position of the second mode. The second transfer rotator 11 is rotated with a second transfer speed which is higher than the first transfer speed of the first rotator. Due to this, the first buffer rotator 16A and the last buffer rotator 16Z will move back along the first buffer trajectory 18A and the last buffer trajectory 18Z. As a result of this, the number of items 2 located in the buffer device 5 will decrease. Since the second transfer rotator 11 is rotated, it will discharge items 2.

Figure 11:
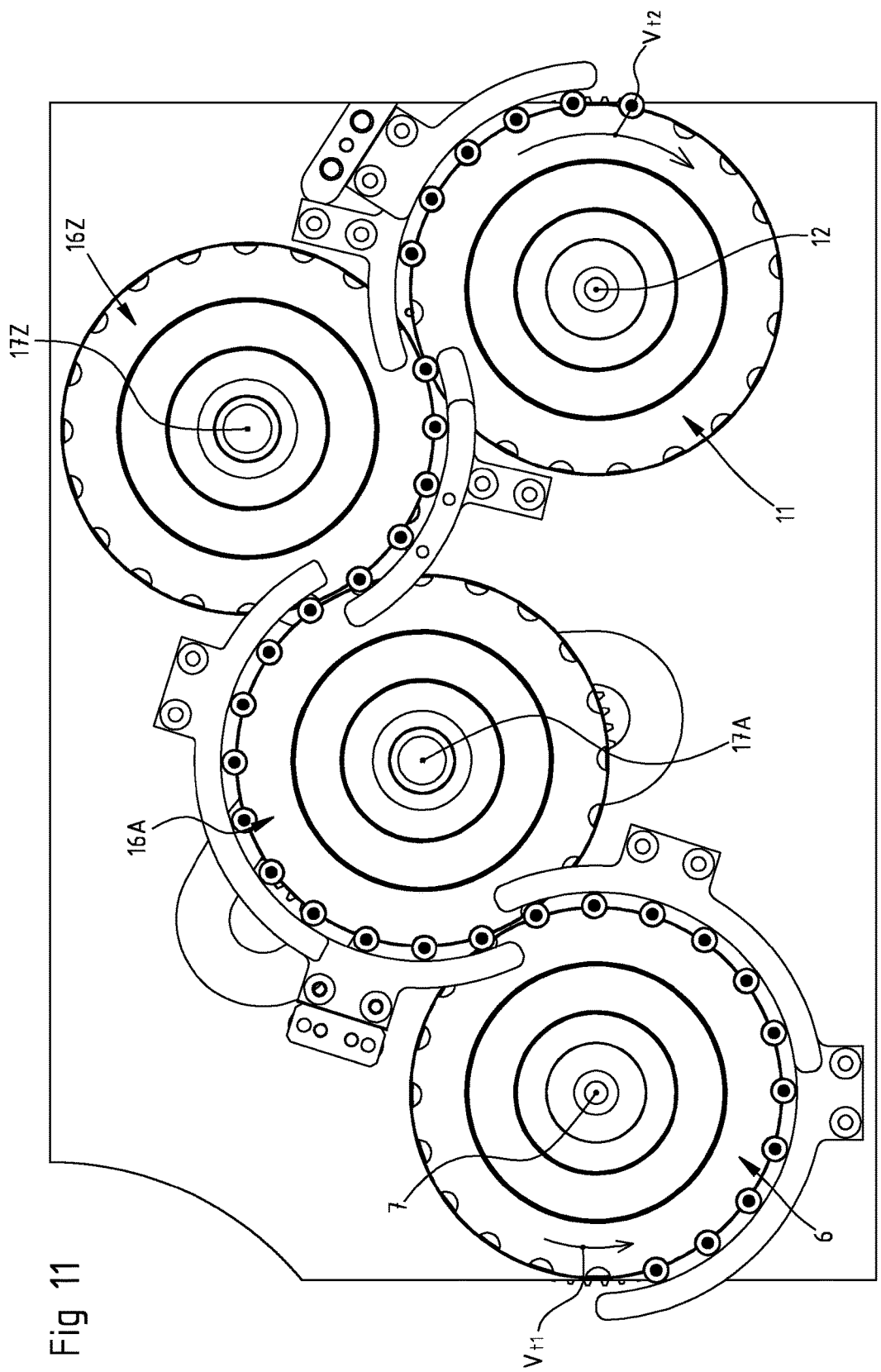

In FIG. 11, the first buffer rotator 16A has moved downwardly along its first buffer trajectory 18A and the last buffer rotator 16Z has moved upwardly along the last buffer trajectory 18Z into its most upper position.

Figure 12:
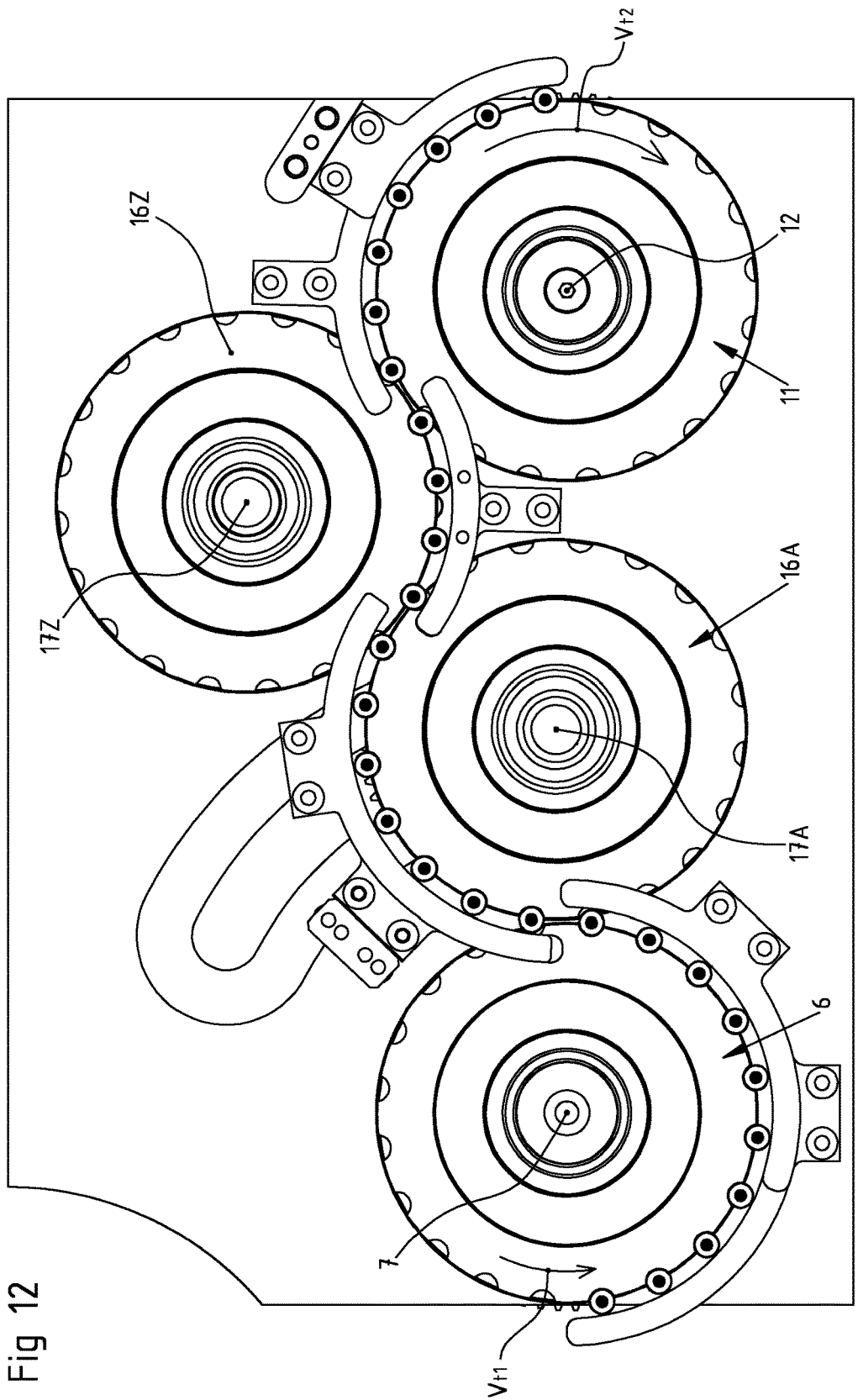

In FIG. 12, the first buffer rotator 16A has moved further downwardly and into the most lower position of the first buffer trajectory 18A. The last buffer rotator 16Z has moved downwardly along its last buffer trajectory 18Z. This is the end position of the second mode and the first mode will start again from here.

By repeating the cycle of the FIGS. 6-12, the items 2 are received by the first transfer rotator 6 in a continuous manner and discharged in an intermittent manner by the second transfer rotator 11.

In other embodiments of the transfer system 1, the first transfer rotator 6 rotates with a varying first transfer speed to receive the items 2 in an intermittent manner and the second transfer rotator 11 rotates with a constant second transfer speed to discharge the items 2 in a continuous manner. In yet another embodiment of the transfer system 1, the first transfer rotator 6 rotates with a varying first transfer speed to receive the items 2 in an intermittent manner and the second transfer rotator 11 rotates with a different varying second transfer speed to discharge the items 2 in a different intermittent manner. Other configurations are also possible.

Figure 13:
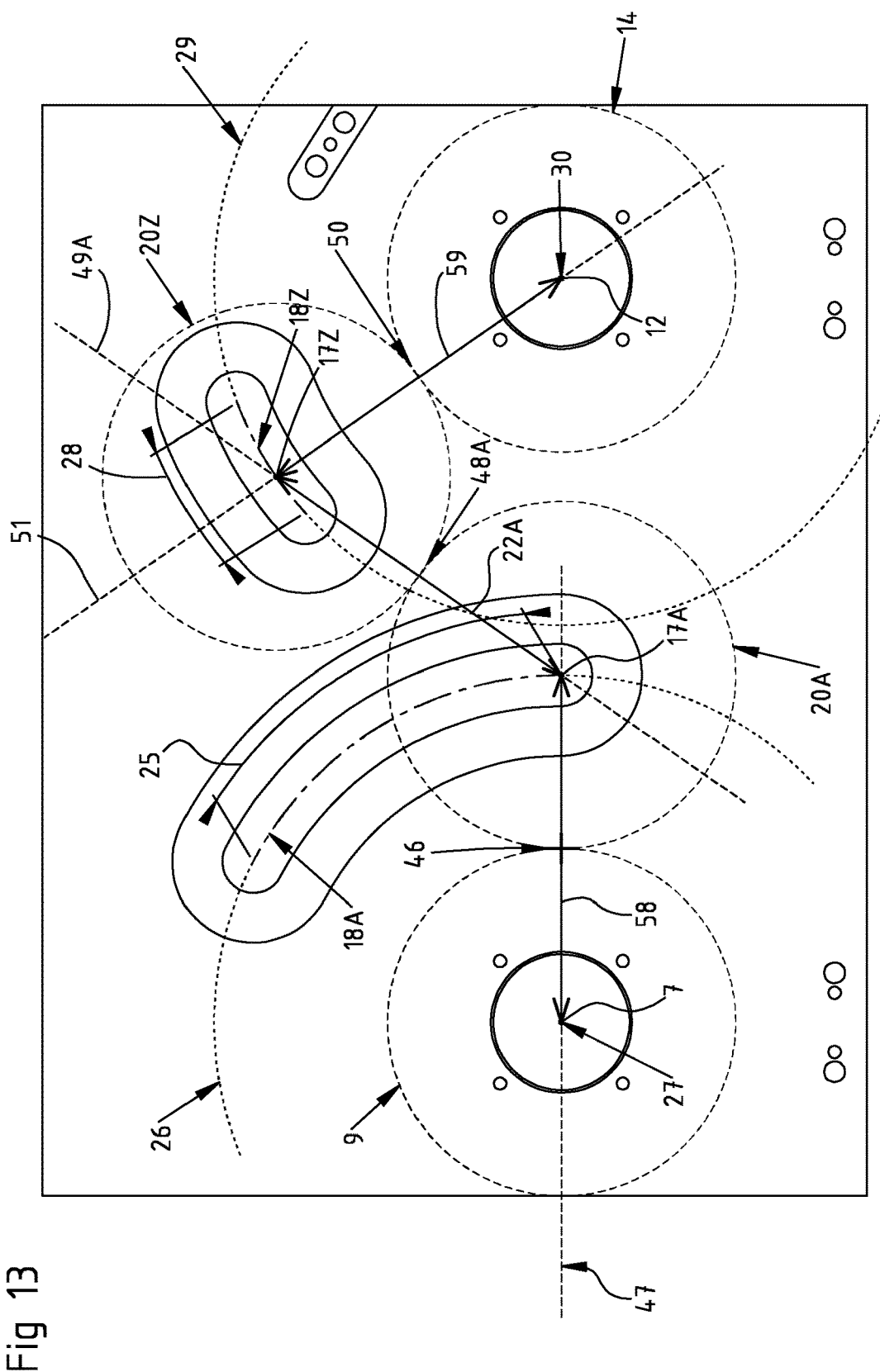
Figure 14:
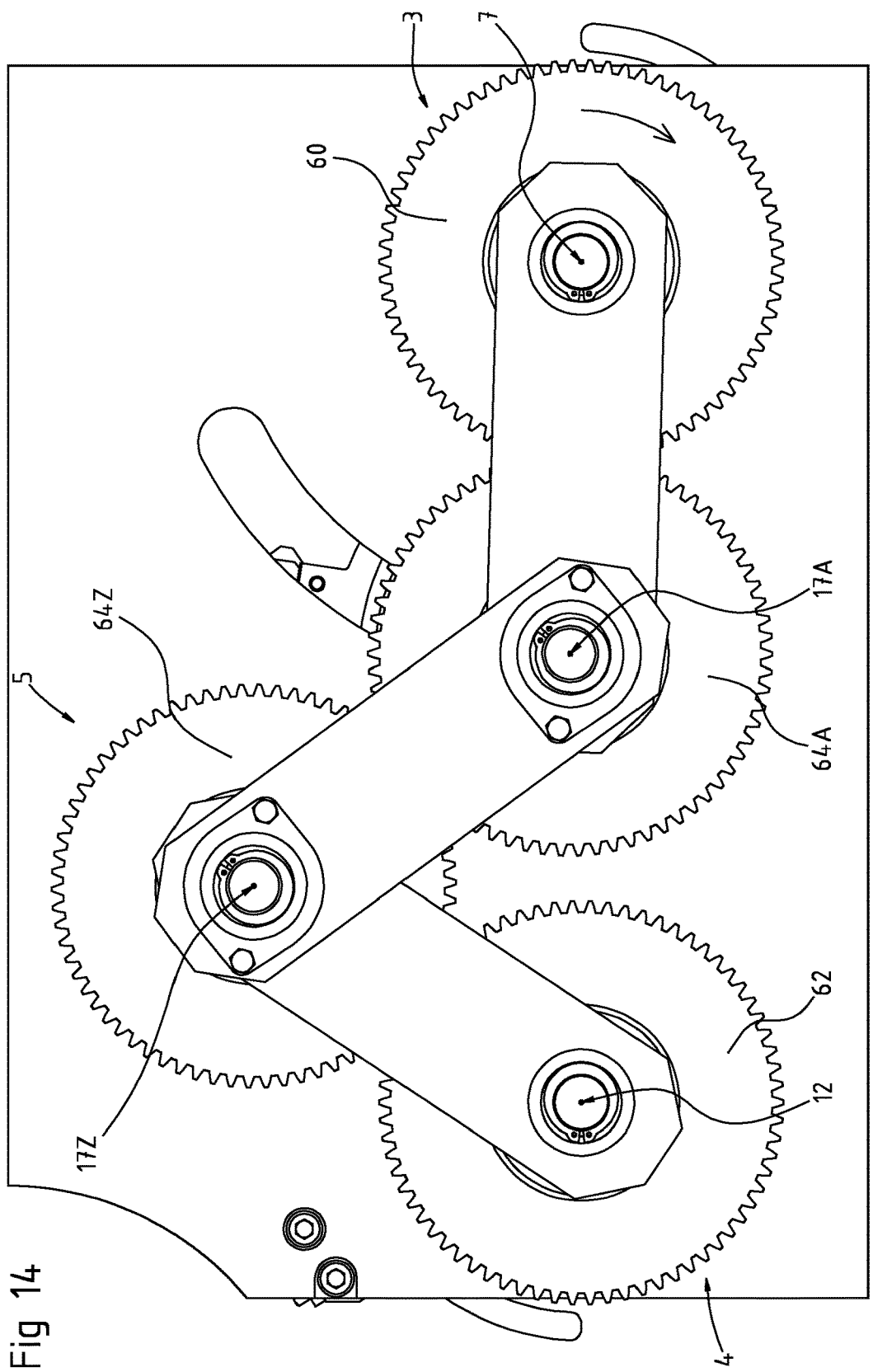
Figure 15:
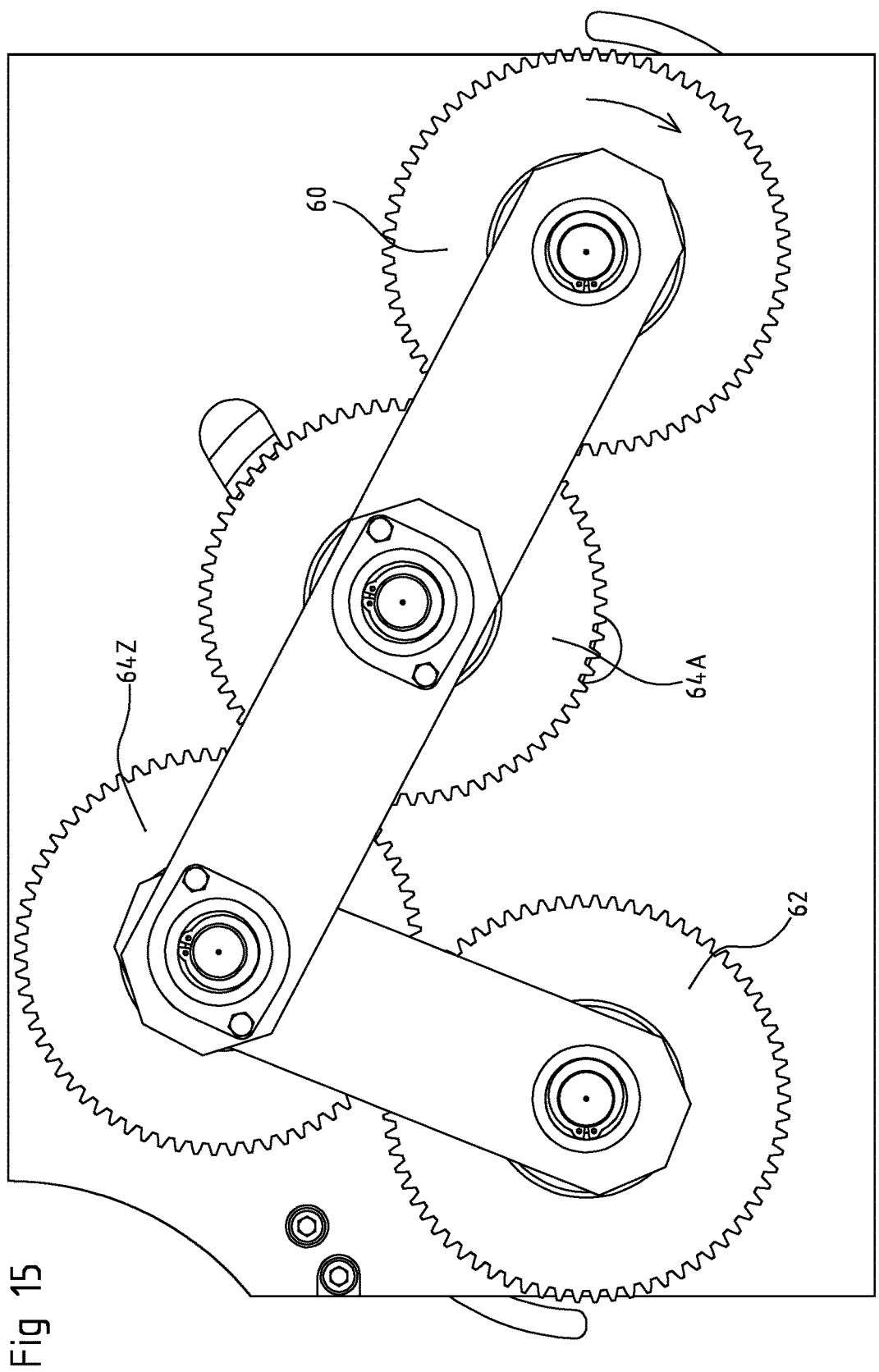
Figure 16:
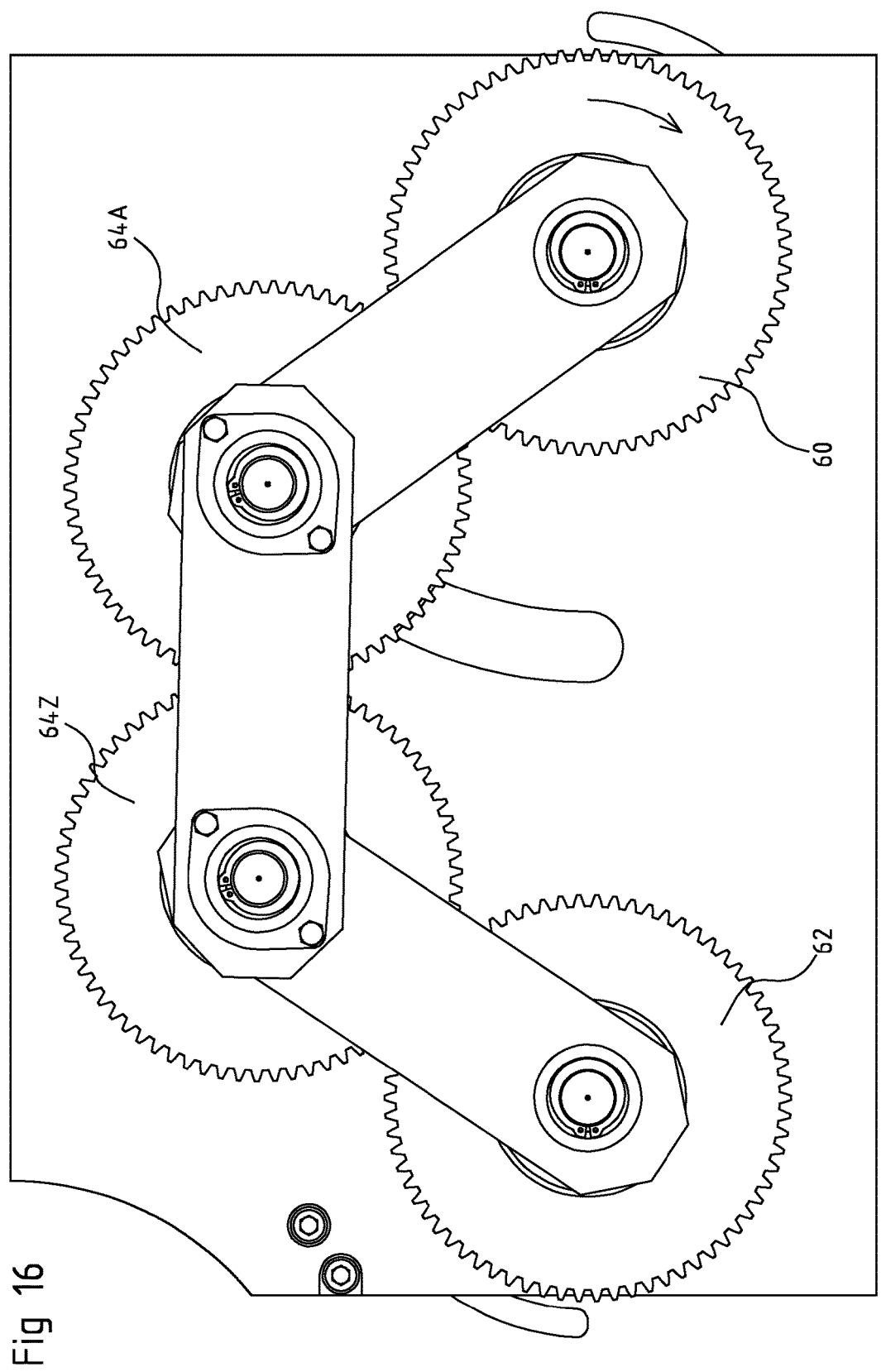
Figure 17:
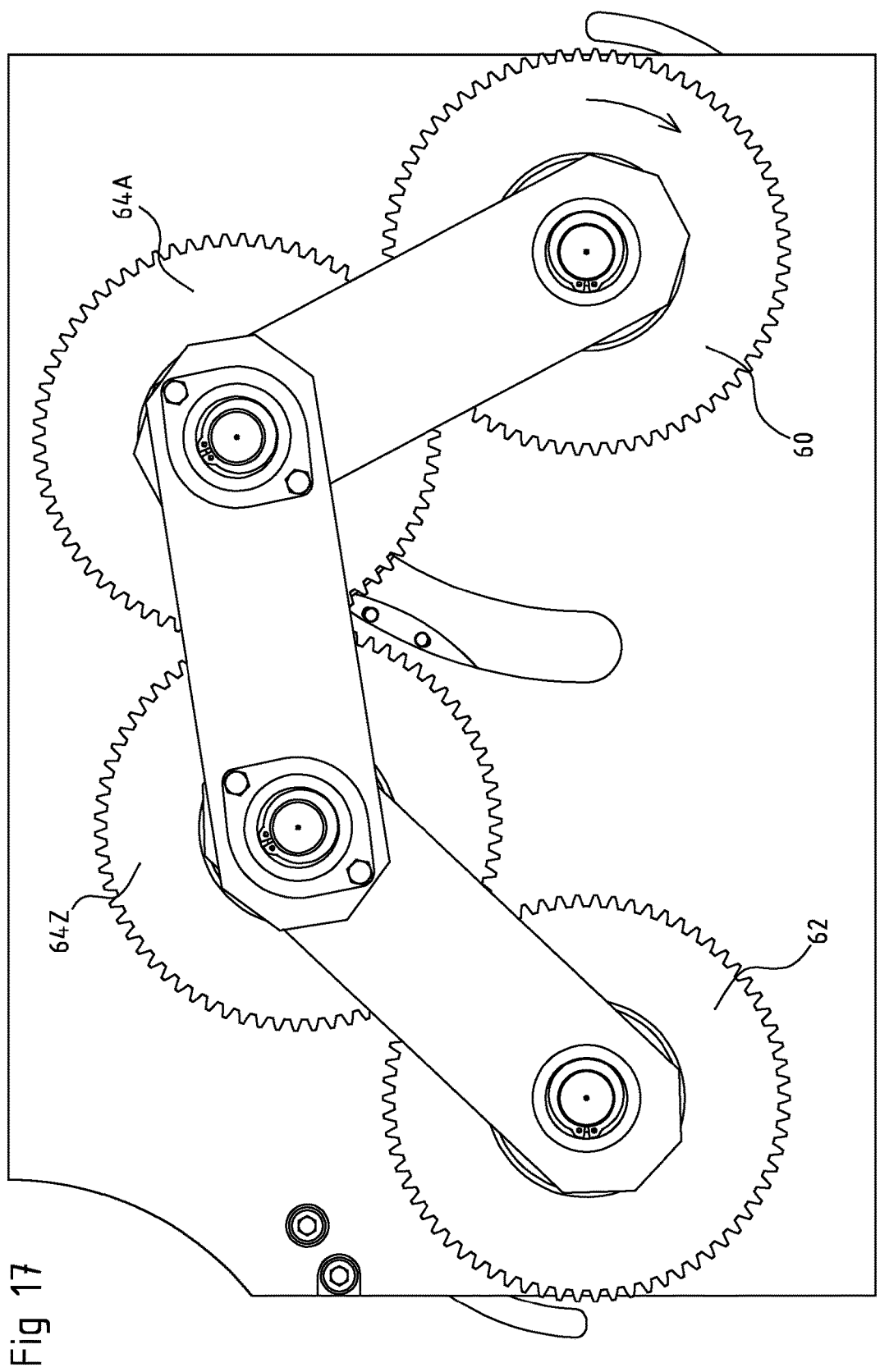

FIG. 13 shows a top view of a base plate 15 of the transfer system 1 of FIG. 1. The first transfer axis 7, first buffer axis 17A, last buffer axis 17Z, and second transfer axis 12 corresponding to the starting position of the first operation mode are shown. In addition, the straight first transfer line 47, first buffer line 49A, and second transfer line 51 are shown. The first part 25 and first centre 27 of the first circle 26 defining the first buffer trajectory 18A, and the second part 28 and second centre 30 of the second circle 29 defining the second buffer trajectory 18B are also shown. In addition, the first circular transfer arrangement 9 of the first transfer holders 8, the first circular buffer arrangement 20A of the first buffer holders 19A, the second circular buffer arrangement 20B of the second buffer holders 19B, and the second circular transfer arrangement 14 of the second transfer holders 13 are shown.

Figure 18:
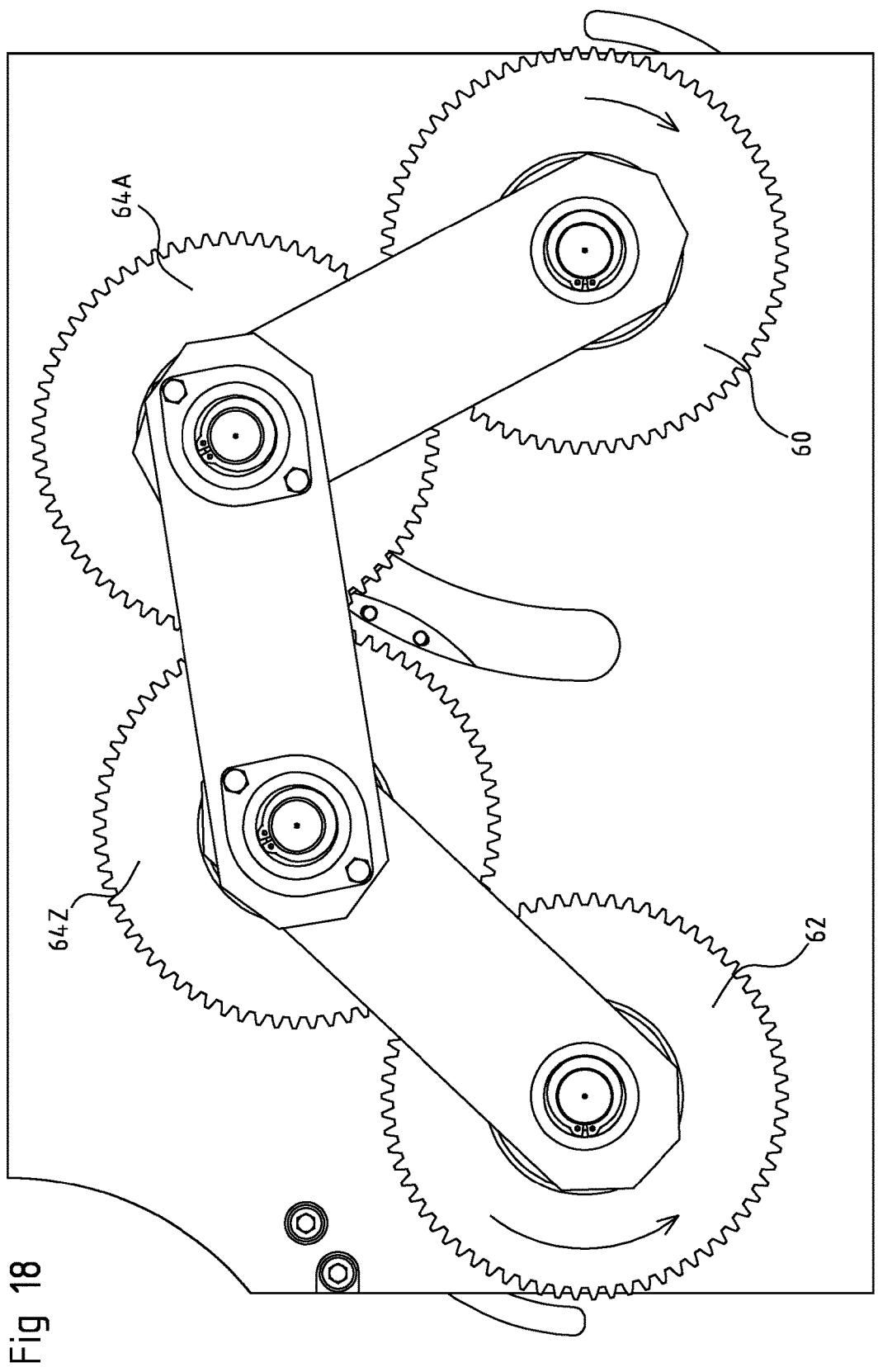
Figure 19:
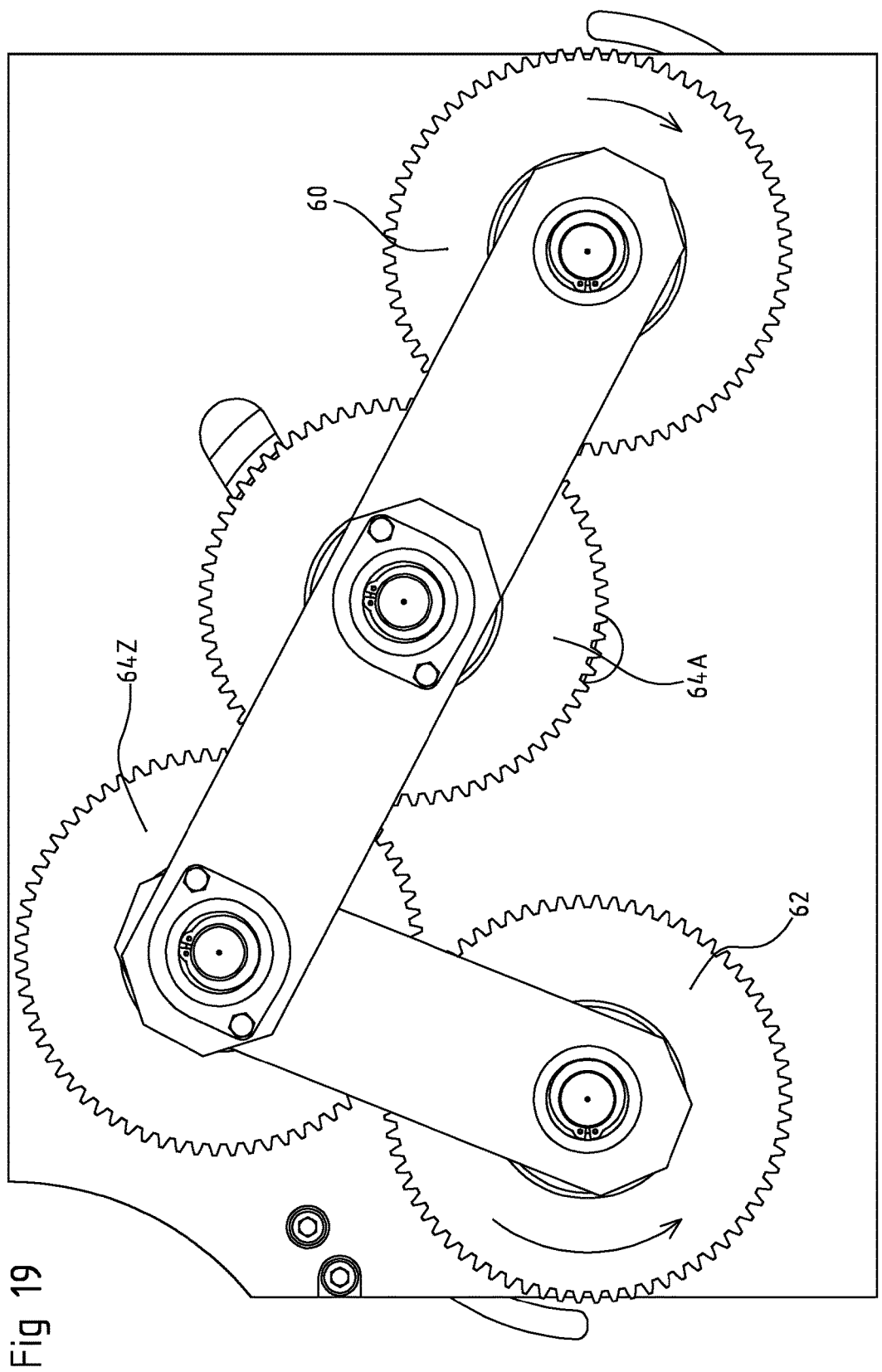
Figure 20:
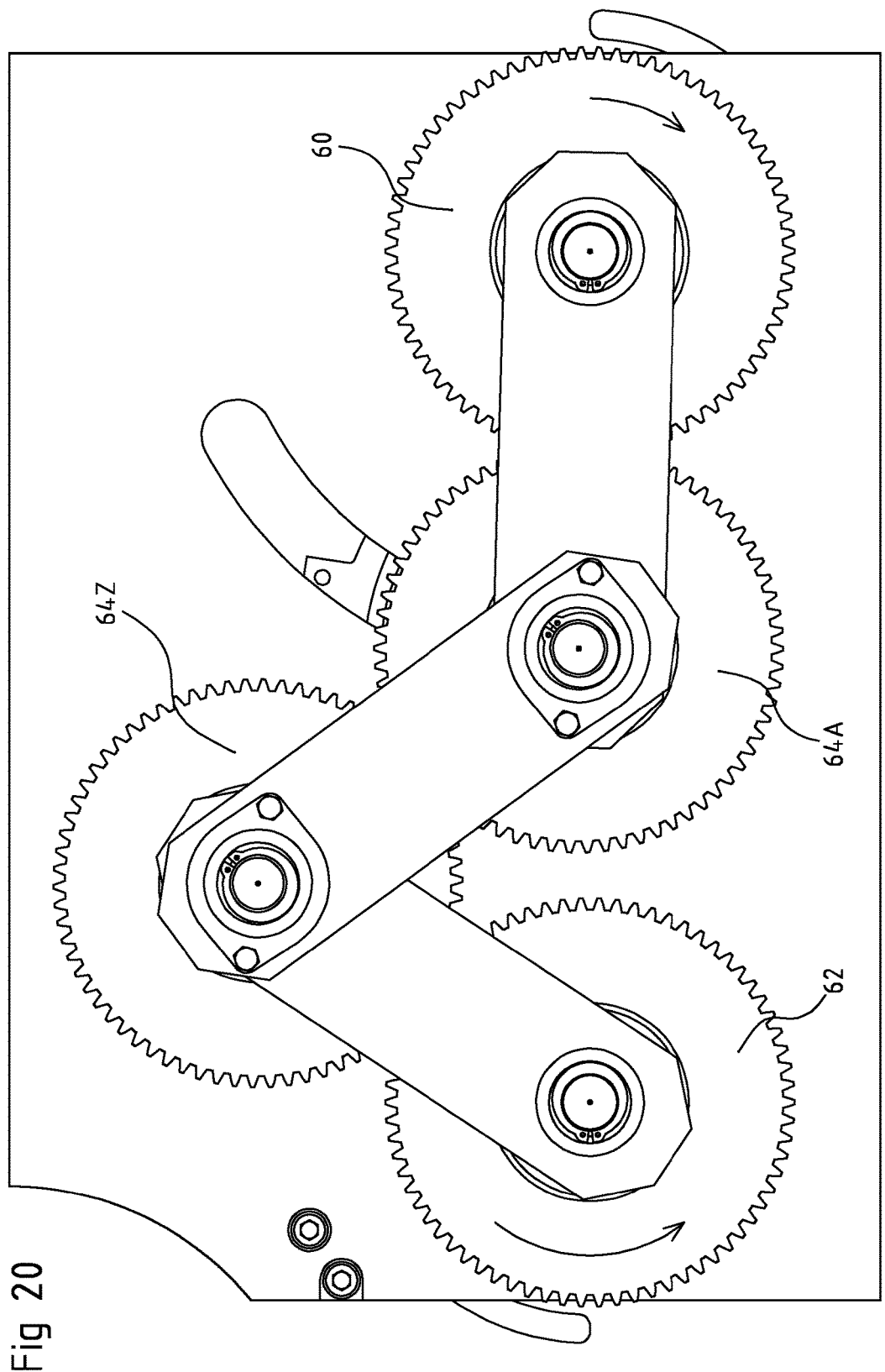

The FIGS. 14-20 show an enlarged view of part of the bottom view of FIG. 5A, without the second rotation drive 35. The FIGS. 14-17 show the first operation mode and correspond to the situations shown in the FIGS. 6-9. The FIGS. 18-20 show the second operation mode and correspond to the situations shown in the FIGS. 10-12.

Figure 21:
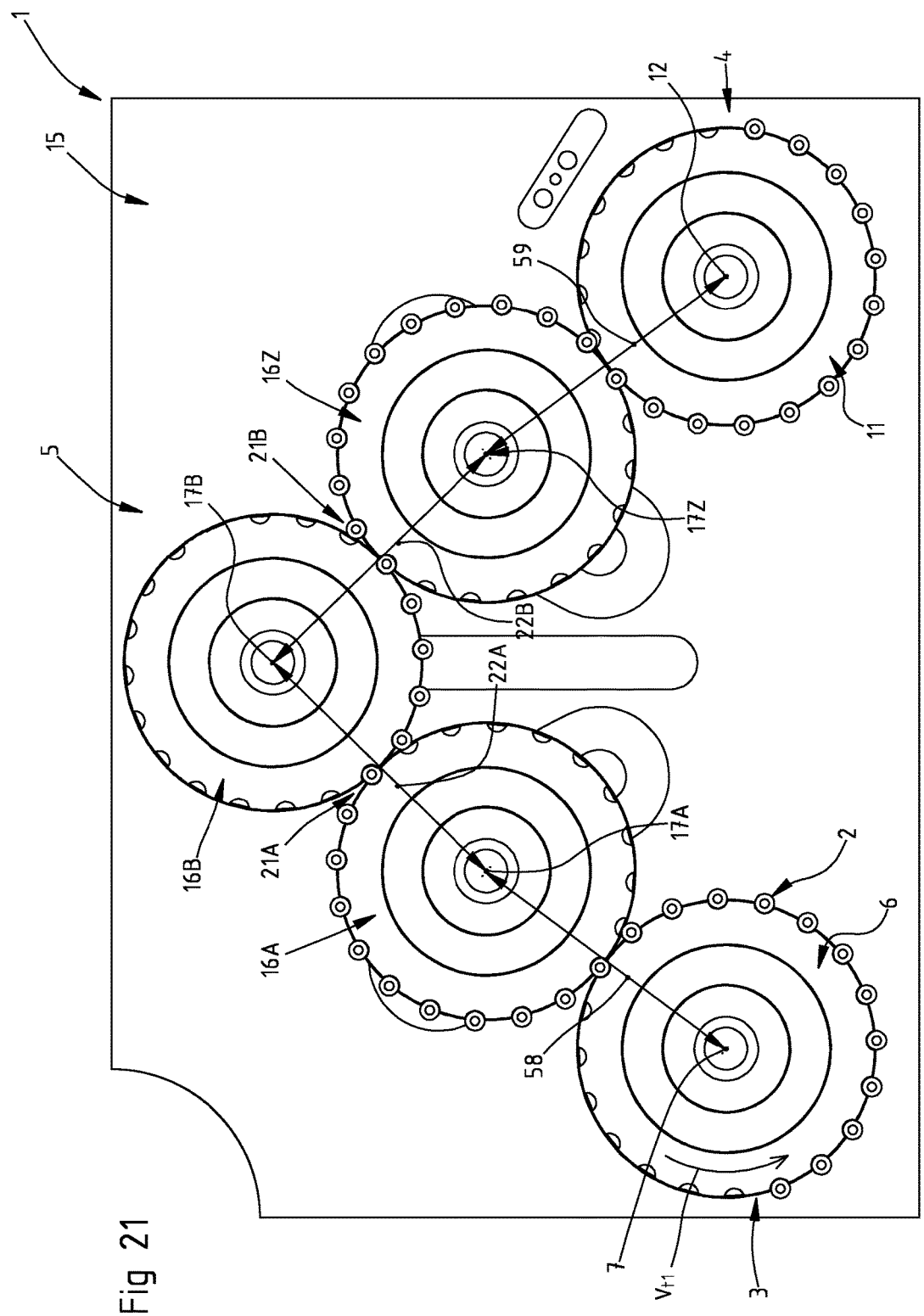
Figure 22:
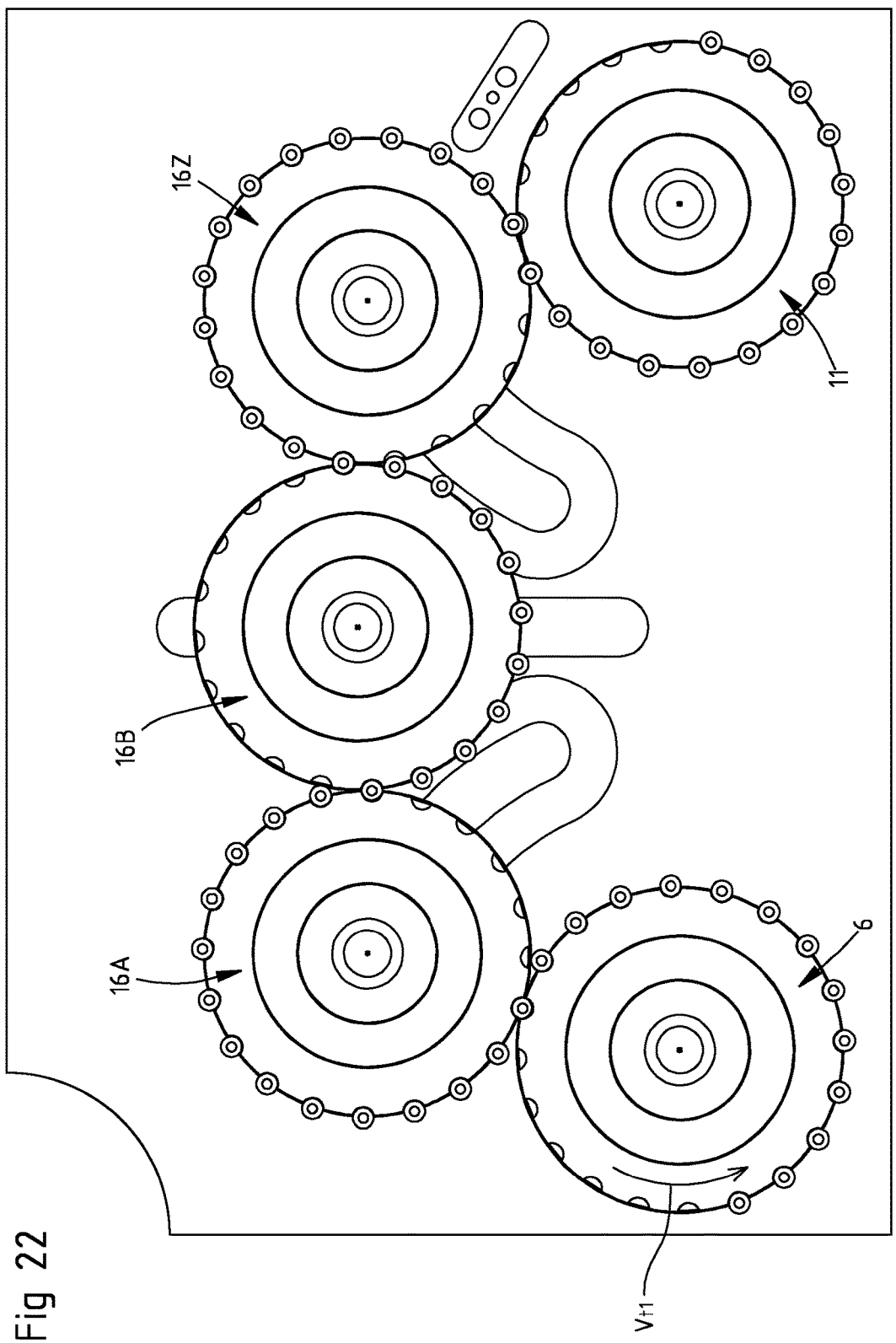
Figure 23:
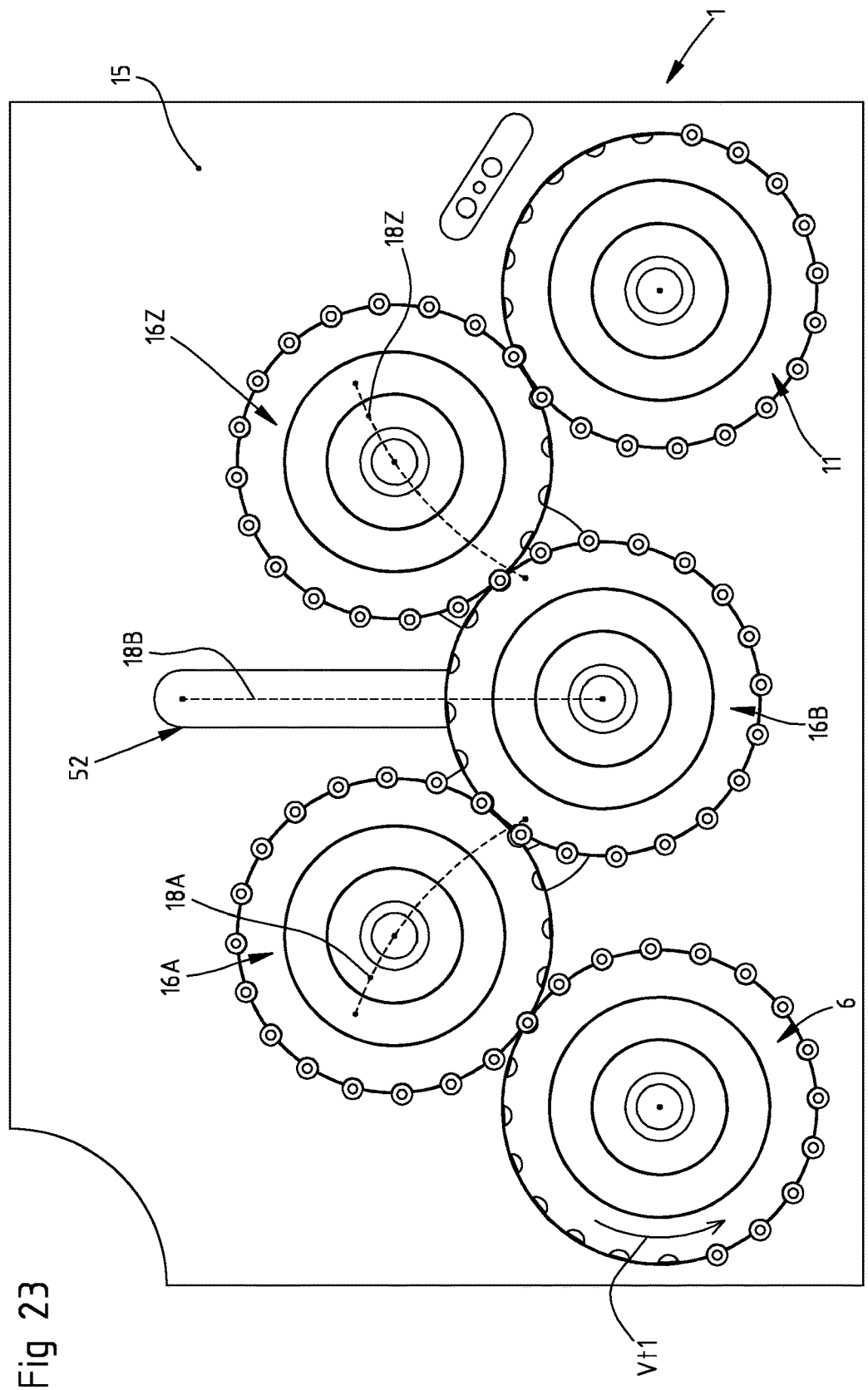
Figure 24:
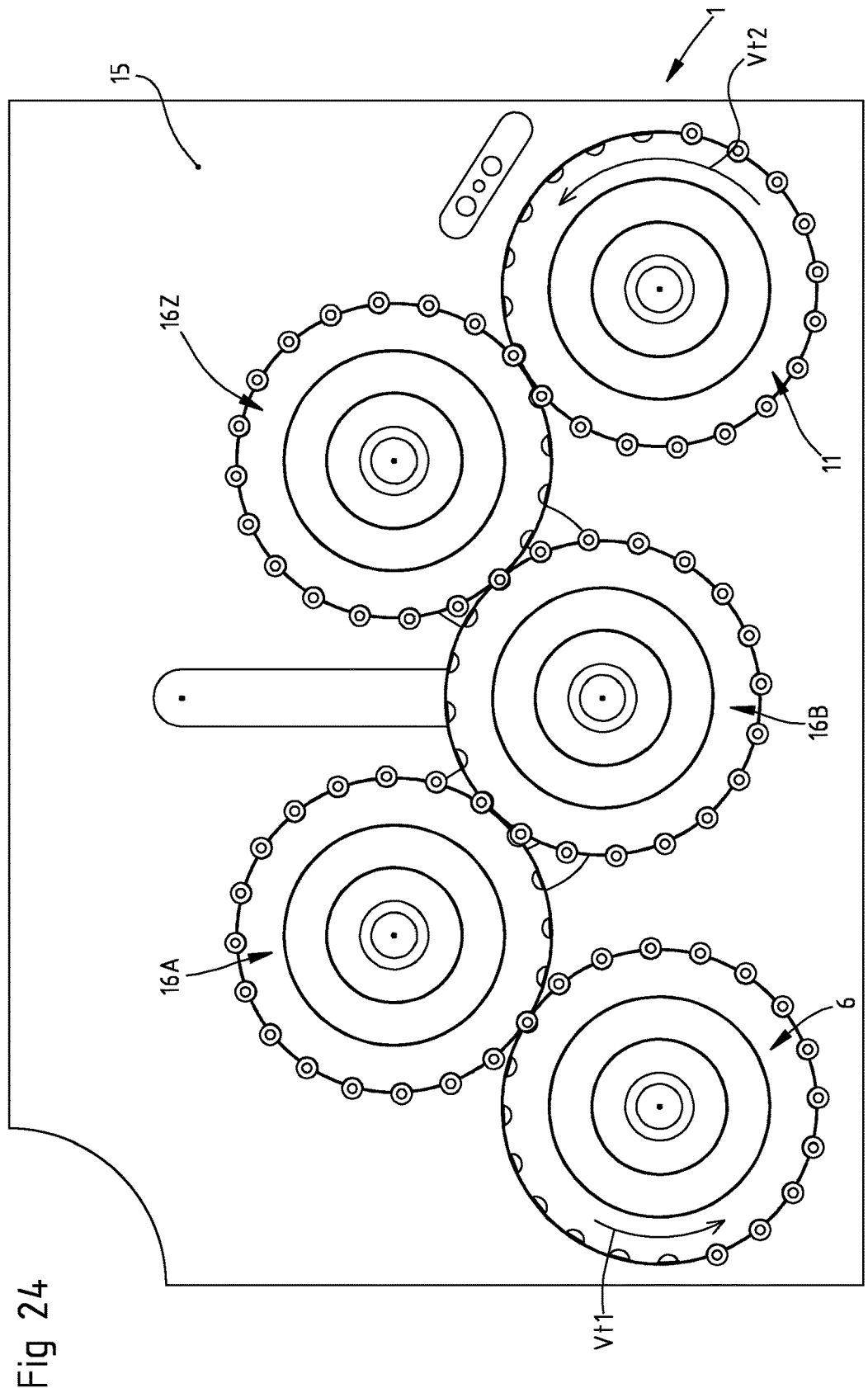
Figure 25:
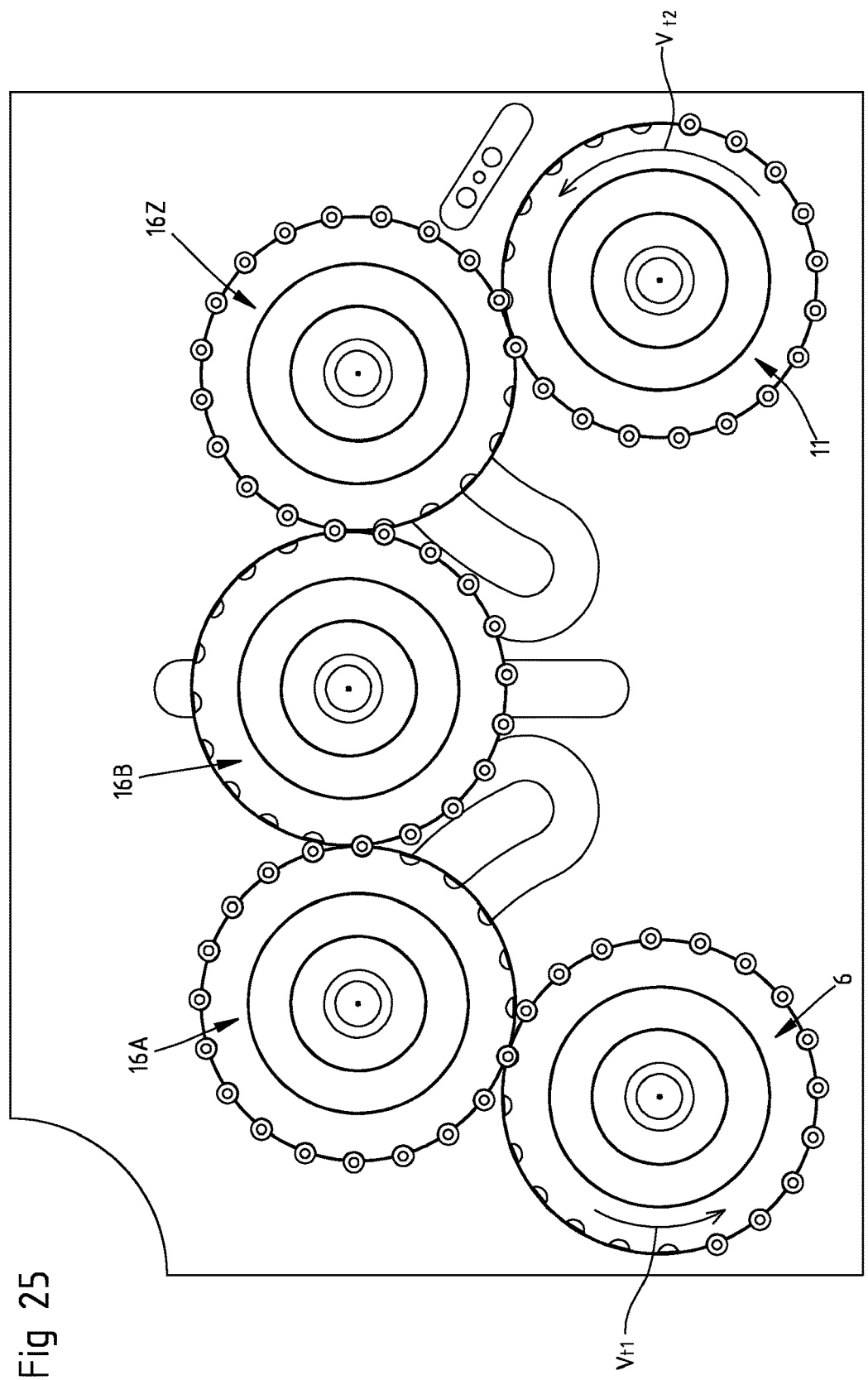
Figure 26:
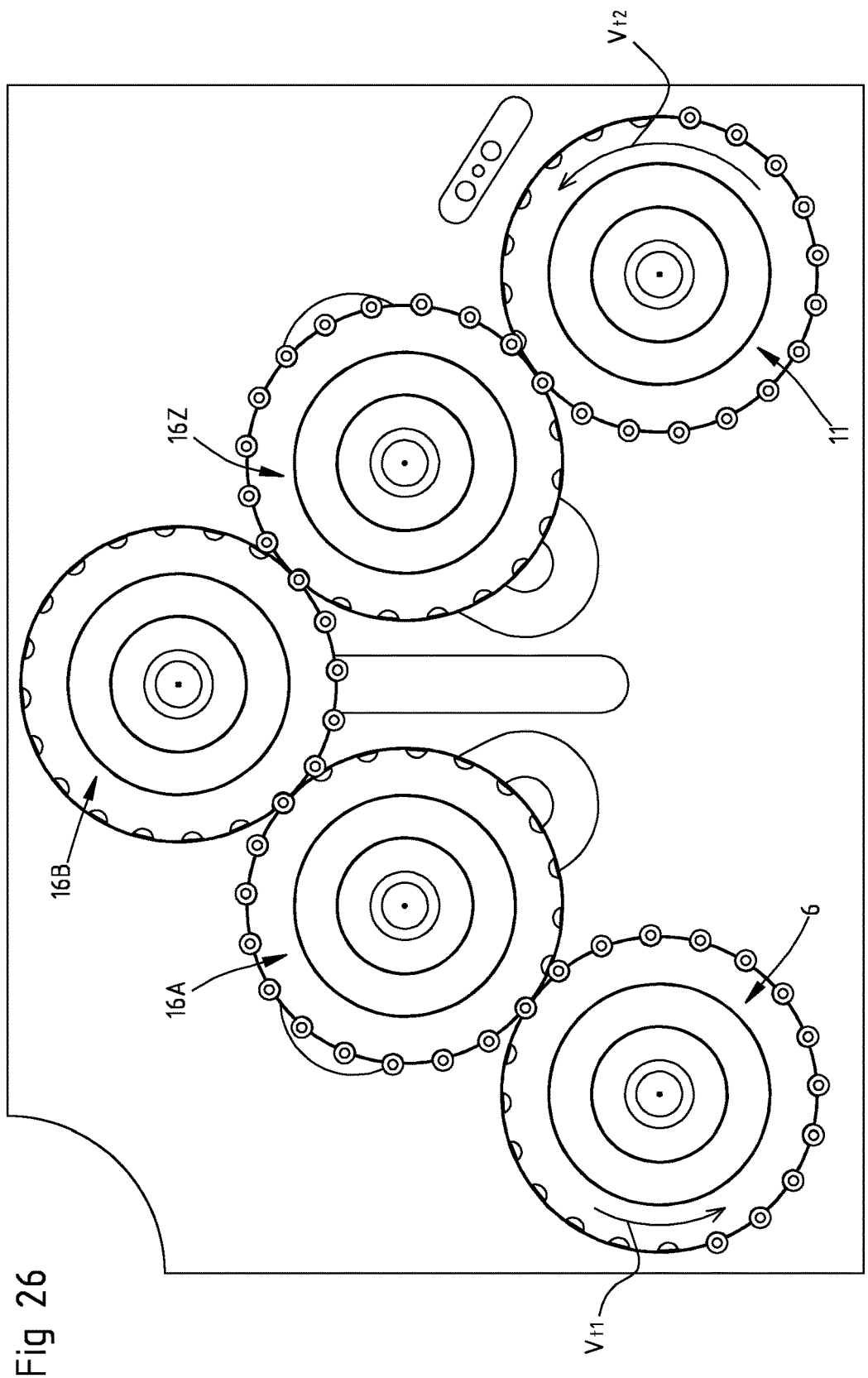

The FIGS. 21-26 show a top view of a second embodiment of the transfer system 1 according to the invention. The FIGS. 21-23 show the first operation mode and the FIGS. 24-26 show the second operation mode of the transfer system 1.

The at least two buffer rotators only comprise the first buffer rotator 16A, the last buffer rotator 16Z, and a second buffer rotator 16B having a second buffer axis 17B which is movable along a second buffer trajectory 18B. The first buffer rotator 16A is arranged near the second buffer rotator 16B in a first buffer region 21A to transfer the items 2 from the first buffer rotator 16A to the second buffer rotator 16B. The second buffer rotator 16B is arranged near the last buffer rotator 16Z in a second buffer region 21B to transfer the items 2 from the second buffer rotator 16B to the last buffer rotator 16Z.

The first buffer rotator 16A and the second buffer rotator 16B are interconnected via a first buffer connector (not shown in the FIGS. 21-26) to maintain a constant first buffer distance 22A between the first buffer axis 17A and the second buffer axis 17B during their movement along the first buffer trajectory 18A and the second buffer trajectory 18B, respectively. The second buffer rotator 16B and the last buffer rotator 16Z are interconnected via a second buffer connector (not shown in the FIGS. 21-26) to maintain a constant second buffer distance 22B between the second buffer axis 17B and the last buffer axis 17Z during their movement along the second buffer trajectory 18B and the last buffer trajectory 18Z, respectively.

The transfer system 1 comprises a movement limiter 52 to ensure that the second buffer axis 17B of the second buffer rotator 16B is only movable along the second buffer trajectory 18B. The movement limiter 52 is formed by a slit provided in a base plate 15 of the transfer system 1. Due to said slit, the second buffer axis 17B of the second buffer rotator 16B cannot be moved sideways but only downwards or upwards. In other examples (or in addition to the movement limiter 52), the transfer system 1 comprises a manipulator to provide the second buffer rotator 16B with a preference to move in a predetermined direction along the second buffer trajectory 18B. This may be formed by one or more springs which act in said predetermined direction.

Figure 27:
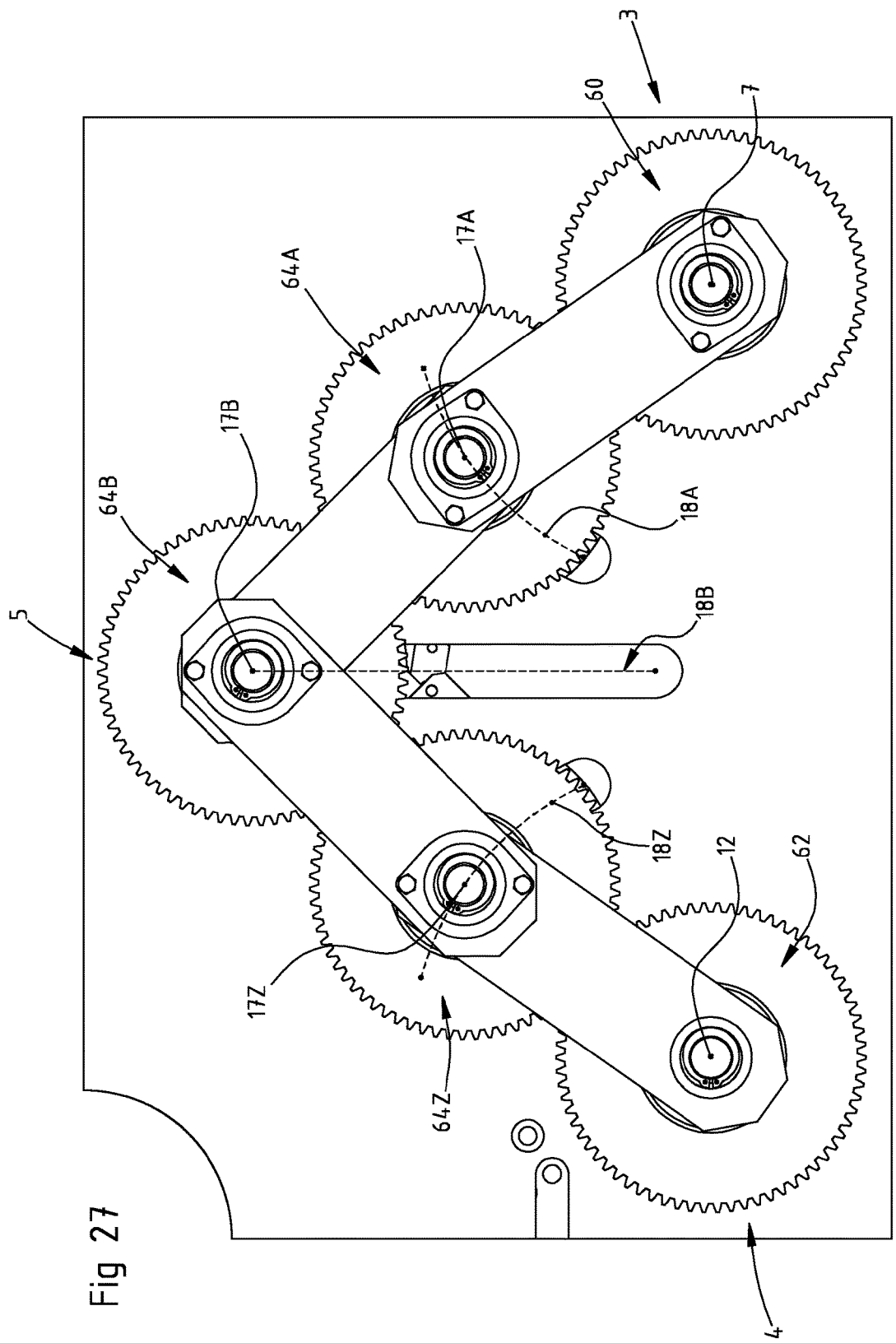

FIG. 27 shows a bottom view of the transfer system 1 of FIG. 21. The first buffer rotator 16A and the second buffer rotator 16B are operatively connected via a first buffer rotation transmission 41A, and the second buffer rotator and the last buffer rotator are operatively connected via a second buffer rotation transmission 41B.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the system and method without departing from the scope as defined in the claims.

The invention claimed is:

1. Transfer system for transferring items, such as parts of a simulated smoking device, which transfer system comprises a first transfer device for receiving the items, a second transfer device for discharging the items, and a buffer device for buffering items between the first transfer device and the second transfer device, wherein;

the first transfer device comprises a first transfer rotator rotatable about a fixed first transfer axis and provided with first transfer holders configured to hold the items, which first transfer holders are arranged in a first circular transfer arrangement around the first transfer axis, the second transfer device comprises a second transfer rotator rotatable about a fixed second transfer axis and provided with second transfer holders configured to hold the items, which second transfer holders are arranged in a second circular transfer arrangement around the second transfer axis, the buffer device comprises at least two buffer rotators, each buffer rotator being rotatable about a respective buffer axis which is movable along a predetermined buffer trajectory, and each buffer rotator being provided with buffer holders configured to hold the items and arranged in a circular buffer arrangement around the buffer axis, the at least two buffer rotators are positioned one after the other, neighbouring buffer rotators being arranged near each other in a respective buffer region to transfer the items from one of the buffer rotators of said neighbouring buffer rotators to the other, the buffer device is configured to hold the buffer axes of neighbouring buffer rotators at a respective constant buffer distance during their movement along their buffer trajectory, the at least two buffer rotators comprise a first buffer rotator having a first buffer axis which is movable along a first buffer trajectory and a last buffer rotator having a last buffer axis which is movable along a last buffer trajectory, the first transfer rotator is arranged near the first buffer rotator in a first transfer region to transfer the items from the first transfer rotator to the first buffer rotator, and the last buffer rotator is arranged near the second transfer rotator in a second transfer region to transfer the items from the last buffer rotator to the second transfer rotator, the first buffer trajectory defines a first part of a first circle having a first centre coinciding with the first transfer axis, the last buffer trajectory defines a second part of a second circle having a second centre coinciding with the second transfer axis, and the transfer system is configured to adjust at least one of a first transfer speed of the first transfer rotator and a second transfer speed of the second transfer rotator.

2. Transfer system according to claim 1, wherein the transfer system is configured to switch between a first operation mode wherein the second transfer speed is lower than the first transfer speed in order to increase the number of items located in the buffer device, and a second operation mode wherein the second transfer speed is higher than the first transfer speed in order to decrease the number of items located in the buffer device.

3. Transfer system according to claim 2, wherein the second transfer speed is equal to zero in the first operation mode.

4. Transfer system according to claim 2, wherein the first transfer rotator rotates during the first operation mode and the second operation mode at the same constant first transfer speed.

5. Transfer system according to claim 1, wherein the transfer system is configured to rotate the first transfer rotator and the second transfer rotator independent from each other.

6. Transfer system according to claim 1, wherein the transfer system comprises a first rotation drive to rotate the first transfer rotator about the first transfer axis at the first transfer speed and a first control unit communicating with the first rotation drive to control the first transfer speed.

7. Transfer system according to claim 1, wherein the transfer system comprises a second rotation drive to rotate the second transfer rotator about the second transfer axis at the second transfer speed and a second control unit communicating with the second rotation drive to control the second transfer speed.

8. Transfer system according to claim 1, wherein neighbouring buffer rotators are interconnected via a respective buffer connector to maintain the constant buffer distance between the buffer axes of said neighbouring buffer rotators during their movement along their buffer trajectory.

9. Transfer system according to claim 1, wherein;
the first transfer rotator and the first buffer rotator are interconnected via a first transfer connector to maintain a constant first transfer distance between the first transfer axis and the first buffer axis during its movement along the first buffer trajectory, and
the second transfer rotator and the last buffer rotator are interconnected via a second transfer connector to maintain a constant second transfer distance between the second transfer axis and the last buffer axis during its movement along the last buffer trajectory.

10. Transfer system according to claim 1, wherein;
the first transfer rotator and the first buffer rotator are operatively connected via a first transfer rotation transmission,
neighbouring buffer rotators are operatively connected with each other by a respective buffer rotation transmission, and
the second transfer rotator and the last buffer rotator are operatively connected via a second transfer rotation transmission.

11. Transfer system according to claim 10, wherein;
the first transfer rotator is connected to a first transfer gear wheel and the first buffer rotator is connected to a first buffer gear wheel, which first transfer gear wheel and first buffer gear wheel are operatively connected to form the first transfer rotation transmission,
each of the neighbouring buffer rotators is connected to a respective buffer gear wheel, which buffer gear wheels are operatively connected to form the buffer rotation transmission of said neighbouring buffer rotators, and
the second transfer rotator is connected to a second transfer gear wheel and the last buffer rotator is connected to a last buffer gear wheel, which second transfer gear wheel and last buffer gear wheel are operatively connected to form the second transfer rotation transmission.

12. Transfer system according to claim 1, wherein;
a first transfer guide is provided at the first transfer region to guide the items from the first transfer rotator to the first buffer rotator,
a buffer guide is provided at each of the buffer regions of the neighbouring buffer rotators to guide the items from one of the buffer rotators of the respective neighbouring buffer rotators to the other, and
a second transfer guide is provided at the second transfer region to guide the items from the last buffer rotator to the second transfer rotator.

13. Transfer system according to claim 12, wherein
the first transfer guide is configured to maintain located in a first transfer position with respect to a straight first transfer line extending through the first transfer axis and the first buffer axis,
each buffer guide is configured to maintain located in a respective buffer position with respect to a straight buffer line extending through the buffer axes of the neighbouring buffer rotators, and
the second transfer guide is configured to maintain located in a second transfer position with respect to a straight second transfer line extending through the second transfer axis and the last buffer axis.

14. Transfer system according to claim 12, wherein each buffer guide is attached to the buffer connector of the respective neighbouring buffer rotators.

15. Transfer system according to claim 12, wherein the first transfer guide is attached to the first transfer connector and the second transfer guide is attached to the second transfer connector.

16. Transfer system according to claim 1, wherein;
the at least two buffer rotators only comprise the first buffer rotator and the last buffer rotator, and
the first buffer rotator is arranged near the last buffer rotator in a first buffer region to transfer the items from the first buffer rotator to the last buffer rotator.

17. Transfer system according to claim 16, wherein the first buffer rotator and the last buffer rotator are interconnected via a first buffer connector to maintain a constant first buffer distance between the first buffer axis and the last buffer axis during their movement along the first buffer trajectory and the last buffer trajectory, respectively.

18. Transfer system according to claim 16, wherein the first buffer rotator and the last buffer rotator are operatively connected via a first buffer rotation transmission.

19. Transfer system according to claim 1, wherein
the at least two buffer rotators only comprise the first buffer rotator, the last buffer rotator, and a second buffer rotator having a second buffer axis which is movable along a second buffer trajectory,
the first buffer rotator is arranged near the second buffer rotator in a first buffer region to transfer the items from the first buffer rotator to the second buffer rotator, and
the second buffer rotator is arranged near the last buffer rotator in a second buffer region to transfer the items from the second buffer rotator to the last buffer rotator.

20. Method for transferring items, such as parts of a simulated smoking device, with a transfer system according to claim 1, comprising;
providing the items to the first transfer rotator of the first transfer device, while the first transfer rotator rotates at the first transfer speed, and
adjusting at least one of the first transfer speed of the first transfer rotator and the second transfer speed of the second transfer rotator in order to control the discharging of the items by the second transfer rotator.

* * * * *